United States Patent
Fritz-Humblot et al.

(10) Patent No.: US 8,473,258 B2
(45) Date of Patent: Jun. 25, 2013

(54) PART DESIGN USING A CONTEXT-FREE GRAMMAR

(75) Inventors: Claire Fritz-Humblot, Saint Cloud (FR); Jean-Francois Rameau, Lisses (FR); Laurent Santiquet, Elancourt (FR)

(73) Assignee: Dassault Systemes, Velizy Villacoublay (FR)

( * ) Notice: Subject to any disclaimer, the term of this patent is extended or adjusted under 35 U.S.C. 154(b) by 261 days.

(21) Appl. No.: 12/909,964

(22) Filed: Oct. 22, 2010

(65) Prior Publication Data

US 2011/0264412 A1    Oct. 27, 2011

(30) Foreign Application Priority Data

Oct. 30, 2009  (EP) .................................... 09290828

(51) Int. Cl.
*G06F 17/50*    (2006.01)
*G06T 17/00*    (2006.01)

(52) U.S. Cl.
USPC ............... 703/1; 345/420; 704/1; 704/2

(58) Field of Classification Search
None
See application file for complete search history.

(56) References Cited

U.S. PATENT DOCUMENTS

| | | | |
|---|---|---|---|
| 5,815,154 A * | 9/1998 | Hirschtick et al. | 715/853 |
| 5,859,786 A * | 1/1999 | Klein | 703/2 |
| 6,525,745 B1 | 2/2003 | Phelan | |
| 7,495,662 B2 | 2/2009 | Rameau | |
| 2003/0085889 A1 * | 5/2003 | Chin et al. | 345/419 |
| 2005/0038642 A1 * | 2/2005 | Rameau et al. | 704/1 |
| 2006/0184343 A1 | 8/2006 | Chin | |
| 2008/0255809 A1 * | 10/2008 | Ran et al. | 703/1 |

FOREIGN PATENT DOCUMENTS

EP    1 686 501    8/2006

OTHER PUBLICATIONS

Partial European Search Report for EP09290828, 5 pages, dated Mar. 30, 2010.
European Search Report for EP09290828, 16 pages, dated Jun. 14, 2010.
Klein, R., "Dependency Maintenance in Declarative Geometry Modeling," Proceedings Fourth Symposium on Solid Modeling and Applications, ACM, New York, pp. 31-41, May 14-16, 1997.

* cited by examiner

*Primary Examiner* — Kamini S Shah
*Assistant Examiner* — Jay B Hann
(74) *Attorney, Agent, or Firm* — Hamilton, Brook, Smith & Reynolds, P.C.

(57) ABSTRACT

The invention relates to a computer implemented method for designing a part modeled by using a seed structure of a context-free grammar, a set of rules of the grammar, at least two design features, each design feature being defined by at least one rule of the set, a priority order between the design features determined by the seed structure and the set of rules. The method comprises the steps of displaying a representation of the part in a graphical user interface according to the priority order, modifying the priority order between said two design features by modifying the set of rules, displaying a representation of the part according to the modified priority order.

14 Claims, 17 Drawing Sheets

Default behavior: negative push trims positive push

Changed behavior: positive push trims

Default priority: cut trims stiffener

Changed priority: stiffener is not cut

Default priority: push trims contacts

Changed priority: contact trim push

PART DESIGN USING A CONTEXT-FREE GRAMMAR

RELATED APPLICATION(S)

This application claims priority under 35 U.S.C. §119 or 365 to European, Application No. 09290828.4, filed Oct. 30, 2009.

The entire teachings of the above application(s) are incorporated herein by reference.

FIELD OF THE INVENTION

The invention relates to the field of computer programs and systems, and more specifically to a computer implemented method for designing a part, wherein said part is modeled by design features.

BACKGROUND OF THE INVENTION

A number of systems and programs are offered on the market for the design of parts, such as the one provided by the applicant under the trademark CATIA. These so-called computer-aided design (CAD) systems allow a user to construct and manipulate complex three-dimensional (3D) models of parts.

A number of different modeling techniques can be used to design a part. These techniques include solid modeling, wire-frame modeling, and surface modeling. Solid modeling techniques provide for topological 3D models, where the 3D model is a collection of interconnected edges and faces, for example. Geometrically, a 3D solid model representing a part is a collection of trimmed surfaces that defines a closed skin. The trimmed surfaces correspond to the topological faces bounded by the edges. The closed skin defines a bounded region of 3D space filled with the part's material. Wire-frame modeling techniques, on the other band, can be used to represent a part as a collection of simple 3D lines, whereas surface modeling can be used to represent a part as a collection of exterior surfaces. CAD systems may combine these, and other, modeling techniques, such as parametric modeling techniques.

Parametric modeling techniques can be used to define various parameters for different design features of a part, and to define relationships between those design features based on relationships between the various parameters. Solid modeling and parametric modeling can be combined in CAD systems supporting parametric solid modeling.

A design engineer is a typical user of a 3D CAD system. The design engineer designs functional, physical and aesthetic aspects of 3D models, and is skilled in 3D modeling techniques. The design engineer designs parts, and may then assemble the parts into one or more subassemblies. In addition to parts, a subassembly may also consist of other subassemblies. Using parts and subassemblies, the design engineer typically designs an assembly.

For example in the field of car body design with a computer aided design system, existing solutions provide the user with geometrical and topological interactive commands. The designer deals with points, planes, curves and surfaces and the task is to create, deform, offset, sweep, extrapolate, trim, smooth, connect these curves and surfaces in order to get the final "body-in-white" shape, starting from an external styling surface.

A part is thus generally designed using various geometric building blocks, using tools generally provided in CAD systems. The order in which a design engineer creates design features while designing a part affects the physical structure of that part in a feature-based CAD. These systems are therefore said to be history-based. For example, a part constructed first by cutting a block with a cylinder and then adding a boss that extends inside the void left by the cut cylinder will result in a hole with material from the boss inside the hole. If the order of the operations were reversed such that the boss was added before the cylindrical cut, then the cut would not only cut the material of the original block, but also that of the subsequent boss, resulting in a hole with no material inside of it.

This is exemplified in FIGS. 1 to 3, which show a window displayed on the screen of a prior art CAD system. FIG. 1 shows a window 2 that contains three views of a part under construction. The top view 4, front view 6, and rotated view 8 reveal that the part is partially defined by two block features (i.e., upper block 12 and lower block 14). Additionally, the top view 4 and the front view 6 plainly show an extruded profile 10 of a circle. The purpose of the extruded profile 10 is to create a cylindrical cut feature in the part. FIG. 2 shows the window 2 after the extruded profile 10 was used to construct a cut feature. The cut 16 was created by subtracting material that was located within the extruded profile 10 from the upper block 12 and the lower block 14. The cut 16 would appear as illustrated in FIG. 2 in a history-based CAD system if the upper block 12 and the lower block 14 were included in the part definition (i.e., existed) prior to the inclusion of cut feature 16. FIG. 3 shows the window 2 containing a part in which a cut feature 18 did not subtract material from the upper block 12. The cut 18 may appear as illustrated in FIG. 3 in a history-based CAD system if the lower block 14 was included in the part definition first, the cut feature 18 was included in the part definition second, and the upper block 12 was included in the part definition third. The example of FIG. 1-3 shows that the order in which design features are entered for defining a part influences the output shape of the part. This discussion in reference to mechanical parts applies to other types of parts or components in a design system, e.g. molded parts, electrical features in a circuit, or more generally any type of features the assembly of which forms parts or components.

Existing CAD systems allow a posteriori modifications by capturing the history of geometrical operations performed by the designer. Modifying the design of a part is for the designer to change input parameters or geometrical objects and for the system to replay the history of operations, yielding a new result.

History-based systems raise different issues.

When using "wire frame and surface" CAD system's workbench, for instance when designing "Body-in-white" parts, features can be created and modified easily as long as they do not overlap too much. The overlapping of design features corresponds to a spatial collision between those design features. The CAD system must manage such a case so that a resulting geometry may still be computed. Beyond a certain overlapping rate the complexity cannot be managed by the CAD system and the designer's responsibility is to imagine how overlapping features should trim each other and to create the resulting geometry through basic tools. It is thus difficult for a designer to modify the design of a part which he first designed a long time before. Indeed, in such a case the designer may have forgotten how he managed overlapping design features and thus cannot take it into account for their modification intentions.

Because of the geometrical semantic provided by existing systems, only the design result is captured by the system, as opposed to the design intent, which remains in the user's mind. This is true even if the CAD system captures historical design. The consequence is that quality of the final shape is the entire responsibility of the designer. To reach a high quality, a dedicated methodology must be set up by the CAD editor together with application specialists (specialists of the field of application of the part). This methodology must be taught to designers, and a dedicated process must check that it is actually used in production. This consumes time and money and raises organization issues.

On the other hand, modifying by replaying the history of recorded operations computes a new but rather similar result. A big design change requires deletion and creation of many geometrical objects. Furthermore, beyond a certain level of complexity (typically the number of geometrical objects and their relationships) only the original designer may be able to perform the modification. Even that is not guaranteed because it is not provided that the designer still remembers what he/she has previously done.

The use of predefined templates has been suggested, but they do not raise the semantic level. They speed up the design creation phase, acting as a dialogue accelerator by creating many geometrical objects in one shot. But modification and rework drawbacks remain the same.

Because of history dependency, collaborative design is out of reach. It is well known that non commutative features cannot be shared easily through asynchronous collaboration. Indeed, if user A sends a design feature F to user B, inserting feature F at the right place in user's B ordered sequence cannot be done automatically.

These issues have been addressed by U.S. Pat. No. 7,495, 662 entitled "Part design system using a context-free grammar". This patent describes a history-based design system for designing a part with design features and a seed structure defined using a context-free grammar, the seed structure being adapted to receive contributions from instantiated design features. The seed structure is built so that the order in which contributions are received does not change the result output by the seed structure or, more specifically, the evaluation of this result by the core system. The seed structure may be edited by an editor. The editor makes it possible to adapt an existing seed structure to make it more efficient, according to the capabilities of the core system, without changing its function. The editor also makes it possible to increase the functional capabilities of a seed structure in a given application.

Through the use of a seed structure of a context-free grammar, U.S. Pat. No. 7,495,662 describes an infrastructure guarantying that the CAD system provides declarative design features. This way, it offers the advantages of history-based design systems even though the order in which the design features are instantiated is not relevant to the resulting part.

However, the solution described by U.S. Pat. No. 7,495, 662 lacks handiness. Indeed, the seed structure capabilities in that patent are fixed at the conception stage with application specialists and cannot be modified by the end user. When designing a part, the designer has to take into account these capabilities. As a consequence, only design intents supported by the previously conceived seed structure may be concretized. It is thus mandatory that the designer designs adapts his/her design intent to the capabilities offered by the seed structure. Such low handiness only authorizes the design of simple and unrealistic parts.

SUMMARY OF THE INVENTION

An object of the present invention is thus to provide means to design a part with the advantages of a history-based design system and high handiness to the designer.

This object is achieved with a computer implemented method for designing a part modeled by using:
 a seed structure of a context-free grammar,
 a set of rules of the grammar,
 at least two design features, each design feature being defined by at least one rule of the set,
 a priority order between the design features determined by the seed structure and the set of rules,
 the method comprising the steps of:
 displaying a representation of the part in a graphical user interface according to the priority order,
 modifying the priority order between said two design features by modifying the set of rules,
 displaying a representation of the part according to the modified priority order.

Preferred embodiments comprise one or more of the following features:
 at the step of modifying the priority order, a swap rule is added to the set of rules;
 the set of rules comprises a swap rule, and at the step of modifying the priority order, the swap rule is removed from the set of rules;
 the set of rules comprises a swap rule, and at the step of modifying the priority order, an un-swap rule is added to the set of rules;
 at the step of modifying the priority order, a bring-to-front rule or a send-to-back rule is added to the set of rules, upon which the priority order is modified;
 the method further comprises a step of applying the rules to the seed structure before each step of displaying;
 applying each rule modifies the seed structure according to at least one non-terminal symbol of the rule;
 each rule replaces a non-terminal symbol of the seed structure corresponding to the non-terminal symbol of the rule;
 each design feature has a type which belongs to a group comprising: stock feature type, push feature type, contact feature type, stiffener feature type, cut feature type, and surface extraction feature type;
 at the step of modifying, a swap rule dependent on the type of the two design features is added to the set of rules;
 the seed structure and the set of rules define a default priority order between the features according to a respective type of the features;
 the method is performed for designing a body-in-white part, wherein the seed structure and the set of rules define a default priority order between the features according to their respective type, and wherein a stiffener feature has a lower default priority than a contact feature, which itself has a lower default priority than a push feature, which itself has a lower default priority that a cut feature.

It is also provided a computer-aided design system comprising:
 a) a database storing a part modeled by:
 a seed structure of a context-free grammar,
 a set of rules of the grammar,
 at least two design features, each design feature being defined by at least one rule of the set,
 a priority order between the design features determined by the seed structure and the set of rules,
 and
 b) a graphical user interface suitable for performing the above method.

It is also provided a computer program comprising instructions for execution by a computer, the instructions comprising means for performing the above method with a graphical user interface of a computer-aided design system, wherein the system further comprises a database storing a part modeled by using:
- a seed structure of a context-free grammar,
- a set of rules of the grammar,
- at least two design features, each design feature being defined by at least one rule of the set,
- a priority order between the design features determined by the seed structure and the set of rules.

It is also provided a computer readable storage medium having recorded thereon the above computer program.

Further features and advantages of the invention will appear from the following description of embodiments of the invention, given as non-limiting examples, with reference to the accompanying drawings listed hereunder.

DETAILED DESCRIPTION OF THE INVENTION

Figure 1:
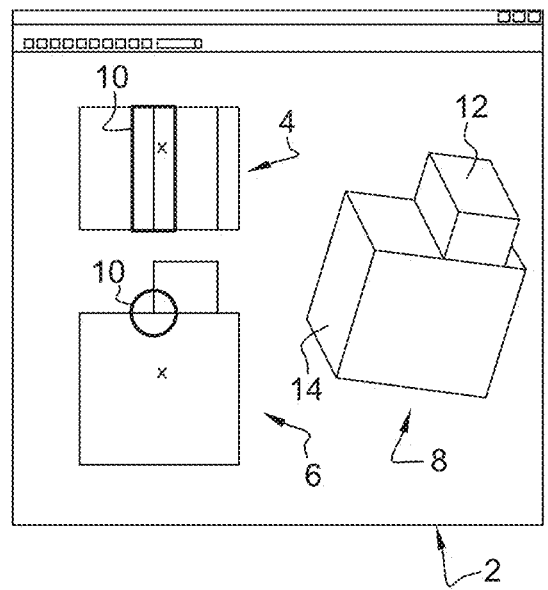
FIG. 1-3 show views of parts in a prior art history-based system.

A computer implemented method according to the invention is intended for designing a part. The part is modeled by using a seed structure of a context-free grammar, a set of rules of the grammar, at least two design features, each design feature being defined by at least one rule of the set, and a priority order between the design features determined by the seed structure and the set of rules. The method comprises a step of displaying a representation of the part in a graphical user interface according to the priority order. The method also comprises a step of modifying the priority order between said two design features by modifying the set of rules. The method also comprises a step of displaying a representation of the part according to the modified priority order.

The priority order between the design features determined by the seed structure and the set of rules provides the advantages of a history-based design system in a declarative system. The step of modifying the priority order by modifying the set of rules provides high handiness to the designer.

The method according to the invention is intended for designing a part. The term "part" generally refers to a mechanical component of an industrial product. However, many variations are possible and within the scope of the invention. For example, the method may also be used for designing an assembly of parts, possibly an entire industrial product (e.g. a wheel of a car). Furthermore, the invention is not solely intended to the design of mechanical parts, but it is applicable to any field where computer design is required. For example, the invention is applicable to the field of video games.

Before exemplifying the method, context-free grammars are discussed briefly. Details on context-free grammars may be found in *Introduction to Automata Theory, Language and Computation*, J. E. Hoperoft and J. D. Ullmann, Addison-Wesley, 1979.

A context-free grammar G is defined by G=(X, V, P) where X is a set of terminal symbols, V is a set of non-terminal symbols and P is a set of rules. A rule is a couple (S, m) where the first object is a non-terminal symbol and the second object is a string made of terminal and non-terminal symbols; more precisely, P is a subset of V×(X∪V)*. A rule is also written as S→m; in other words, a rule applied to a string changes a non-terminal symbol into a string made of terminal and non-terminal symbols. A string of symbols in the grammar is called a word. Using a context-free grammar makes it possible to recursively produce words in a well-defined syntax by applying rules of the grammar. Context-free grammar theory also provides algorithms to scan these words, i.e. check their syntax to ensure that they were produced through the application of rules of the grammar. In this respect, the function of a non-terminal symbol is to be replaced by a string made of terminal and non-terminal symbols—thanks to the application of a rule where the non-terminal symbol intervenes.

The part is modeled by a seed structure of a context-free grammar. The seed structure is defined and edited in the context-free grammar. As such, the seed structure is merely a word of the context free grammar. The grammar provides a formal and rigorous environment for defining seed structures. It allows checking syntax of a seed structure to avoid that it violates syntactic rules. This is fully independent of the field of application in which the method is used. This is explained in U.S. Pat. No. 7,495,662 and will be further detailed below with reference to the meta-grammar.

The part is also modeled by using a set of rules of the grammar. The part is also modeled by at least two design features. Each design feature is defined by at least one rule of the set.

A set of rules of the grammar is an unordered collection of rules taken among all the rules of the grammar. The notion of a set is known from set theory.

When designing a part, the designer typically starts from a seed structure. The seed structure used may depend on the field of application. For example, a designer generally uses a different seed structure for designing a part for a ship from the seed structure for designing a part for a car.

Figure 2:
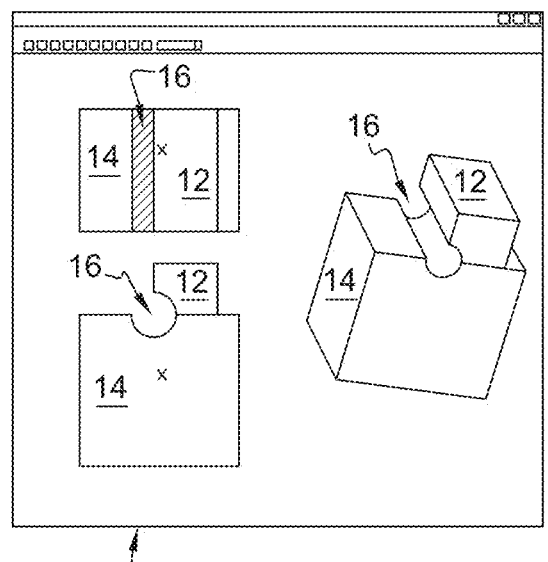
Figure 3:
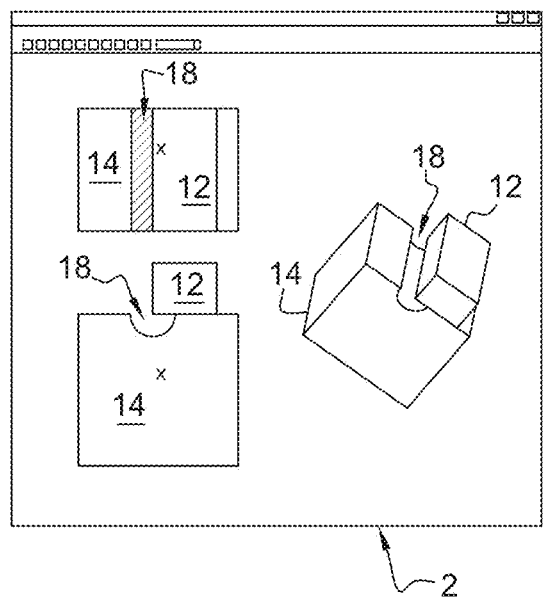

Then the designer creates design features to model the part. A design feature is a constraint added to the part, for example geometrical or topological constraint. It is provided by functionalities of the CAD system used by the designer. Design features, hereafter also referred to as features, are classified according to their type. For example, FIGS. 1-3 illustrate the use of block features (which correspond to the addition of volumes represented by blocks 12 and 14) and a cylindrical cut feature (which corresponds to cut 16). Many features may be provided to the designer. The list of features provided to the designer depends on the CAD system used by the designer. A non exhaustive list includes block features, extrusion features, round features, filet features, etc. Other types of features are disclosed later. Further to their type, design features may make use of parameters. For example, referring to the example of FIGS. 1-3, the block features make use of coordinates of the volume added. The same applies to the cut feature for the volume cut. The possible parameters for a feature depend on the CAD system used by the designer. Also, the same geometrical or topological models of a part may be achieved with different features. For example, the cut 16 may be obtained by creating a cylindrical cut feature and inputting as parameters the coordinates of the axis of the cylinder, its radius, and possibly a height. But the cut 16 may also be obtained by creating a cut feature (no specification of the form of the cut) and inputting as parameters the information that the cut is a cylinder, and then the coordinates of the axis of the cylinder, its radius, and possibly a height. Thus, two parts with the same geometry may be modeled differently, even though the system used by the designer is the same.

The method may be performed with any features known in the art to model the part. Each design feature is defined by at least one rule of the set. A design feature may be defined by one rule, or by a plurality of rules. A design feature may consist in one or more contributions. A contribution is a modification of the part model, for instance the addition of a volume, the cut of a volume, the translation of a volume, the rotation of a volume, the reduction of a volume, etc. Each contribution may be defined by a rule of the grammar. In that case, a feature consisting in several contributions is defined with at least as many rules as its number of contributions, provided that no simplification is achieved. Allowing a feature to be possibly defined with several rules offers advanced capabilities to the designer. The designer is not restricted to basic operations. Features intuitively perceived by application specialists may thereby be modeled. In the following, contributions may refer to the rules which implement them, and conversely.

The rules defining the features may be applied to the seed structure in any order. As explained above, a word is obtained through the application of the rules to the seed structure. Upon the order of application of the rules, the word may be different.

A priority order between the design features modeling the part is determined by the seed structure and the set of rules. The priority order translates design intent. As mentioned above in reference to FIGS. 1-3, depending on the priority order between block features and the cut feature, the result is different. Whatever the order of application of the rules to the seed structure, the priority order ensures that the part modeled by the word obtained is the same. Because the priority order is determined by the seed structure and the set of rules, with no additional information concerning the order of application of the rules, the method provides the advantage of a history-based system, i.e. translating design intent into priorities between features, in a declarative system. While a history based method keeps track of the order of declaration features, by recording an order of application of the rules, the present method does not need such a record. Rules remain declarative, i.e. with no order of application between them. But still, design intent is translated with priorities between features. As a consequence, a posteriori modifications of the design of a part, or concurrent design are performed easily. In addition, time spent for teaching a methodology to the designers is saved.

The use of a context free grammar makes it easy to apply contributions to the seed structure, by using recursive functions. Specifically, the seed structure is a word comprising a number of terminal and non-terminal symbols. Those symbols are used for applying contributions to the seed structure. Non-terminal symbols could be understood as "inputs" to the seed structure. Terminal symbols are used to specify the operations that combine the objects (solid objects in the examples). In this respect, applying a contribution to the seed structure can be carried out merely by replacing a non-terminal symbol of the seed structure by a contribution; assuming a contribution is a word, this is simply a given rule of the grammar. For ensuring recursivity—the ability to apply any number of contributions to the seed structure—it is sufficient to apply a contribution to the seed structure by replacing a non-terminal symbol of the seed structure by a sequence comprising not only the contribution but also the replaced non-terminal symbol. In the rest of this specification, a rule in which the replaced non-terminal symbol appears in the replacing string may be also called a substitution, or a symbolic substitution. Using this definition of a substitution, a rule is applied to the seed structure by using a substitution for changing a non-terminal symbol of the seed structure into a word comprising the non-terminal symbol and the contribution. This ensures that the resulting word still comprises the non-terminal symbol, to which an additional contribution may again be applied. This further ensures that the structure of the seed structure is preserved throughout the inputting of contributions.

Using a context-free grammar further makes it easy for the expert-user to ensure that the system remains declarative: it is sufficient to check that substitution rules, which allow contributions to be applied to the seed structure, remain commutative, i.e. the seed structure and the rules are adapted for the result be the same whatever the order of application of the rules.

Figure 4:
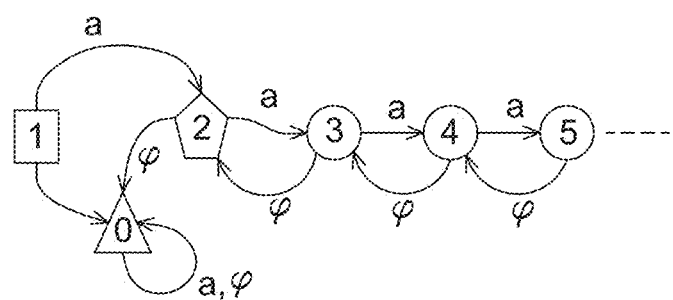
FIG. 4 shows a pushdown automaton for checking words of a context-free grammar.
Figure 5:
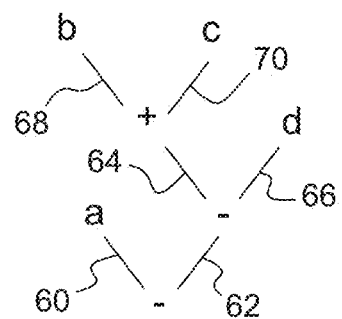
FIG. 5 shows an example of a tree corresponding to a word produced with the grammar which may be checked by the pushdown automaton of FIG. 4.
Figure 6:
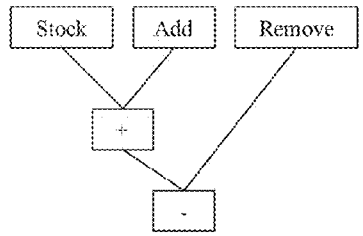
FIG. 6-11 show an example illustrating the swap priority concept.
Figure 7:
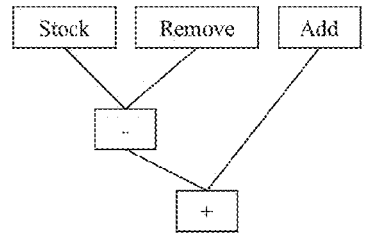

A simple context-free grammar is now discussed in reference to FIGS. 4 and 5 in order to illustrate the above explanations. This grammar is defined as follows:

$$X=\{a,\phi\}$$

$$V=\{S\}$$

$$P=\{S\mapsto SS\phi, S\mapsto a\}$$

Symbol a is the first terminal symbol and it represents any solid—defined in the embodiment by a contribution or by an ordered sequence of primitives and operations of the core system. Symbol $\phi$ is the second terminal symbol and represents any operation, such as the operation of union (+), subtraction (−) and intersection (x). Non-terminal symbol S may be replaced by a sequence of non-terminal symbols and terminal symbols, using the rules contained in the set P of rules. Specifically, the first rule $S\mapsto SS\phi$ replaces a non-terminal symbol S by the result of the operation between two non-terminal symbol. This result is noted $SS\phi$, which is simply a more compact way of saying $S\phi S$. In terms of trees, the first operation replaces a leaf S of a tree by a node having two branches. The node is the result of the operation $\phi$ on two non-terminal symbols located at the end of the branches. The second operation $S\mapsto$ a replaces a non-terminal symbol by a terminal symbol and is typically used when a given value—a terminal symbol—is to be applied to a leaf of the tree.

The syntax of a word produced with this grammar may be checked by the pushdown automaton represented in FIG. 4. In this figure, state 1 is the initial status; state 2 is the final status. The syntax is correct if the automaton reaches the final status after reading the last symbol, otherwise, it is not. The person skilled in the art of formal languages understands that the syntax of any word in the grammar may be checked easily. Thus, the use of a context-free grammar allows to check the syntax of words, through the use of pushdown-automata.

FIG. 5 is an example of a binary tree corresponding to a word coded in this grammar. This tree corresponds to the word abc+d-- which is a compact way of writing a-((b+c)-d). Of course, this depends on the way the scheme employed to read the word. Other grammars may produce words with a different form but still corresponding to trees.

This tree is produced through the following sequence of grammar rules:

$$S \mapsto SS- \mapsto aS- \mapsto aSS-- \mapsto aSd-- \mapsto aSS+ \\ d-- \mapsto abS+d-- \mapsto abc+d--$$

In other words, one starts from a non-terminal symbol 5; the first operation is applied for replacing the non-terminal symbol by a tree having two branches 60 and 62 with a – operation at the root. The second operation is applied to replace the non-terminal symbol S in the leaf of first branch 60 of the tree by a terminal symbol a. The first operation is then applied to the remaining non-terminal symbol in the leaf of branch 62, which is replaced by a tree having two branches 64, 66 with a – operation at the root. The second operation is applied to replace the non-terminal symbol S in the leaf of branch 66 of the tree by a terminal symbol d. The first operation is then applied to the non-terminal symbol in the leaf of branch 64, which is replaced by a tree having two branches 68, 70 with a + operation at the root. The second operation is applied twice to replace the non-terminal symbols S in the leaf of branches 68, 70 by terminal symbols b and c. In the example of FIG. 5, non-terminal symbol S does not appear any more, since all instances of S were replaced by a tree or a terminal symbol.

In the description of FIG. 5, symbol a is used for describing the terminal symbol; it is also used as one of the possible solids a, b, c and d. One thus understands that the context-free grammar may have a high number of rules. Indeed, there might be as many rules of the form S→a as there are different parameters authorized for solid a. Conversely, symbol a may be a reference to a memory allocation where parameters used by the contribution are stored. In that case, there might be as many rules as such memory allocations. The way such rules are encoded in the systems is intuitive to the skilled person and is not further detailed.

The example of FIGS. 4 and 5 illustrates how the word produced may correspond to a tree. Indeed, the context-free grammar may be suitable for producing words corresponding to trees (i.e. words isomorphic to trees). Trees are intuitive representations to model a part and are thus widely used in feature-based CAD. A context-free grammar adapted to produce words corresponding to trees has thus the advantage of offering an intuitive modeling of parts. Other types of context-free grammars may however be used.

The method comprises a step of displaying a representation of the part in a graphical user interface according to the priority order. A designer of a part typically works with a representation of the part displayed in a graphical user interface. Although the part is modeled by using the seed structure, the set of rules, the design features, and the priority order between the design features, a representation of the part allows intuitive designing and facilitates the work of the designer.

The method also comprises a step of modifying the priority order between said two design features by modifying the set of rules. This step allows designing a part with a high handiness. Indeed, a system with priority orders determined by the seed structure and the set of rules, keeps history-based method's advantages although the design is declarative. Modifying the priority order between two design features provides flexibility to the designer using such a system.

Together, these steps provide a tool for designing parts with a declarative system with the advantages of a history-based-system.

The method may also comprise a step of displaying a representation of the part according to the modified priority order. This allows the designer to observe the result of his modification. If the result is not satisfying enough, the designer may repeat the action with other features, that is, modifying a priority order between one of the features and another feature or between two other features. Thus the steps of modifying and displaying may be iterated.

The representations of the part may be three-dimensional. 3D representations offer a realistic view to the designer. However, the method also applies to a two-dimensional representation.

Such a method reduces learning and training time, reduces design time cycle by lowering complexity and allowing parallel/collaborative teamwork design. Intrinsic behavior of features guarantees a better quality of the final result. Time saved can shorten time to market or can be spent studying other design alternatives.

The part may be modeled by more than two features. In that case, the method may comprise a step of selecting two features with a priority order between them. The priority order between these two features only may then be modified. This allows local flexibility. The method may conversely comprise a step of selecting more than two features with priority orders between them. The order may then be modified in one step. For example, if three features are selected, the feature with the lowest priority may be placed at the top position. Other functionalities may be provided, depending on the field of application or on the designer preferences.

The method may comprise a step of applying the rules of the set of rules to the seed structure before each step of displaying. This provides a word modeling the part from which a representation of the part is easily computed. Alternatively, the method may display a representation, without actually applying the rules to the seed structure, but by scanning the rules and modifying the representation dynamically. This has the advantage of pointing at distinct contributions to the user.

Applying each rule may modify the seed structure according to a non-terminal symbol of the rule. The seed structure may thereby define a priority order by being modified according to a different kind of rule. Each rule may then replace a non-terminal symbol of the seed structure corresponding to the non-terminal symbol of the rule. The priority order between two design features is thereby determined at least partly by the non-terminal symbol (or symbols) of the context free-grammar involved in the rules defining the design features and the position of this symbol (or symbols) in the seed structure.

Different situations where modification of the priority order may occur are now discussed.

In an example, at the step of modifying the priority order, a swap rule is added to the set of rules. The addition of a swap rule to the set of rules allows swapping priorities, i.e. modifying a priority order between two features, without changing the seed structure.

The swap priority concept is explained through a simple model with reference to FIGS. 6-11 and then generalized. In the example of FIGS. 6-11, a first feature inputs a solid, the stock, and then some material can be added to or removed from the stock. Removing material has a higher priority than adding material. This application semantic is captured through the seed structure corresponding to the tree represented by FIG. 6. In the following, the term "seed structure" designates, in addition to the seed structure itself, a tree corresponding to the seed structure or the rule leading to the seed structure Notice that the reversed application semantic (material addition has a higher priority than material removal) may be captured by the seed structure of FIG. 7.

Figure 8:
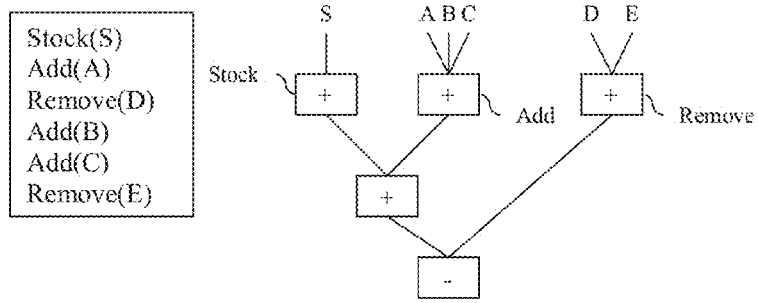

Now, the designer instantiates one "stock" feature, solid S, three "add" features A, B, C and two "remove" features D, E, no matter what the ordered sequence can be. The part is thus modeled by the seed structure of FIG. 6 and a set of rules determining the above features. The set of rules is explicated later. For convenience purposes the features are named Stock(S), Add(A), Remove(D), Add(B), Add(C), Remove (E). The list of features is represented on the leftmost part of FIG. 8. The remove features have a higher priority than the add features. The structure of FIG. 8 represented on the rightmost part of FIG. 8 gathers this design intent.

This structure is compliant with the default behavior (removal has higher priority) since D and E trim A, B and C. But suppose that the designer wants to change this behavior for any arbitrary couple of features. For example, suppose that the designer wants "add" feature B to have a higher priority than "remove" feature D. This can be achieved without changing the seed structure by removing solid B from solid D just before adding solid D to the "remove" node of the seed structure. This yields the tree of FIG. 9.

Figure 9:
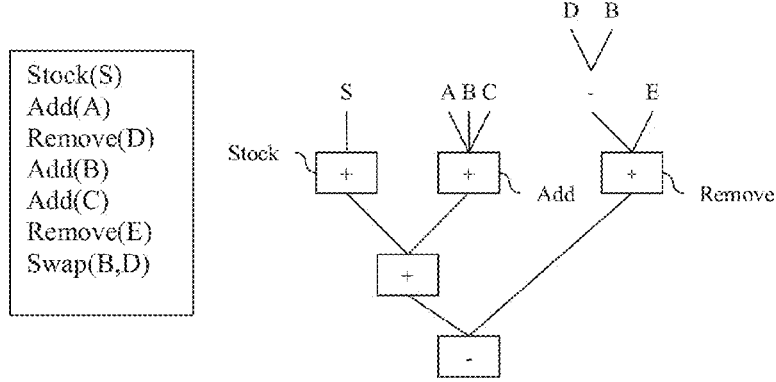
Figure 10:
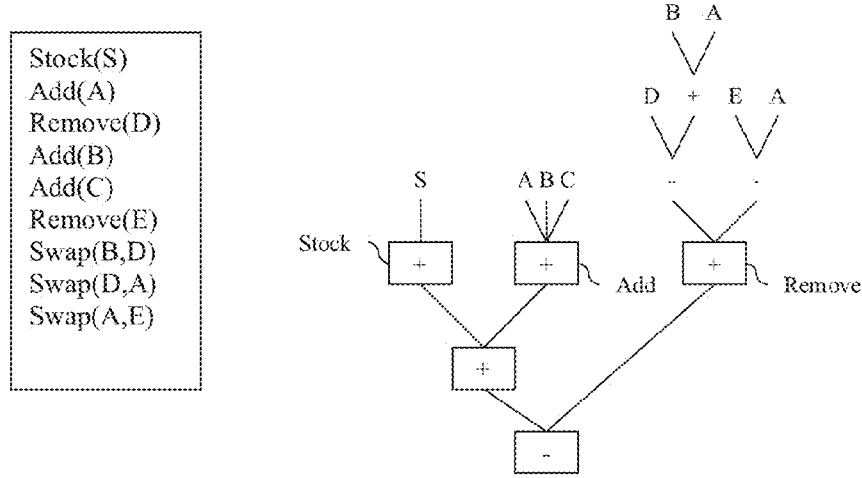
Figure 11:
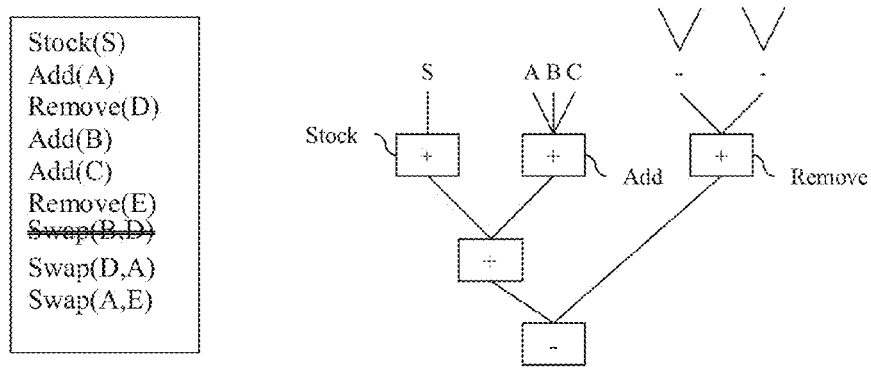

This way, solid D avoids the space occupied by solid B and then does not trim solid B. The "Swap B and D" feature, represented as Swap(B,D) in FIG. 9, is added to the list of design features. A swap feature may be defined by at least one rule of the grammar. Thus, swapping priority between two features may comprise the addition of at least one rule to the set of rules modeling the part. Swapping priority between other features, for example features D and A, then E and A is to repeat this process, which yields the tree and the list of features of FIG. 10.

Thus, upon previous actions by the designer, the set of rules may comprise a swap rule. In that case, at the step of modifying the priority order, the swap rule may be removed from the set of rules. This allows canceling the previous modification of a priority order.

Conversely, at the step of modifying the priority order, an un-swap rule may be added to the set of rules. The un-swap rule implements an un-swap design feature. The un-swap rule is a rule of the grammar which allows un-swapping a previously swapped priority. "Un-swapping" is to go back to the behavior previous to the addition of the swap rule to the set of rules. From the contributions management point of view, this is to retrieve corresponding local removal. For example, "un-swapping" Swap(B, D) yields the tree of FIG. 11. Adding an un-swap rule to the set of rules allows canceling a previous modification of the order while keeping track of the cancellation. The un-swap rule is represented by the cross-out lines on the swap rule to which it applies ("~~Swap(B,D)~~") in FIG. 11.

As is the case in the example of FIGS. 6-11, the seed structure and the set of rules may define a default priority order between the features. This default priority order may be defined according to a respective type of the features. For example, the example above provide three types for the features (stock, add, and remove). The default priority in a decreasing order from high priority to low priority is remove, then add, then stock. This means that first the stock feature is applied, then the add features, and then the remove features. Providing a default priority order provides a higher applicability to an application field.

The default priority order depends on the field of application and on the types of features. A default priority order adapted to the field of application allows considerable time saving when designing parts intended for that field of application. Thus, for a part modeled by at least two features, a priority order between the two features may be consequent to such a default priority order. The default priority order is determined by the seed structure and the set of rules, as will be exemplified later. Briefly, design features are defined by at least one rule of the grammar, to be applied to the seed structure. This rule makes at least one non-terminal symbol intervene. The default priority order may be partly determined by the position of this non-terminal symbols in the seed structure, with respect to other non-terminal symbols. The position of non-terminal symbols determines the order in which contributions are applied to the part, thereby determining a priority order. Default priorities are defined to solve the most frequent design situations, say 80%. This does not mean that 80% of industrial parts can be designed because experience shows that in almost each industrial part, there is at least one situation where the default priority between two features needs to be swapped. Consequently, the "swap priority" feature, implemented at least by a swap rule as mentioned earlier, is mandatory to finish the design of industrial parts. In other words, without the "swap priority" feature, only simple and non realistic parts can be designed.

It is clear that the method provides all possible swap combinations, while controlling the structure depth. At most two depth levels are added to the original (swap free) structure. Despite the default behavior determined by the default priority order holds almost all the time, there always exists, in any industrial design, a case when a priority swap is necessary. Providing this capability through a genuine design feature (the swap feature) contributes to flexibility and ease of use.

Mathematical proof of the swap process ensures that the result computed after a priority swap is the same result computed if the operations are performed in the reverse order. It is enough to prove this result in the following simple case since generalization is straightforward.

Start with a stock solid S, a standard add feature A and a standard remove feature D, which yields the structure (S+A)–D. Then, swap priority of add and remove features, which yields the structure (S+A)–(D–A). Using standard Boolean algebra and standard notations, the mathematical proof states that $$(S+A)-(D-A) = (S+A)-(D\cdot\overline{A})$$

$$= (S+A)\cdot\overline{(D\cdot\overline{A})}$$
$$= (S+A)\cdot(\overline{D}\cdot A)$$
$$= (S\cdot(\overline{D}+A)) + (A\cdot(\overline{D}\cdot A))$$
$$= (S\cdot\overline{D}) + (S\cdot A) + (A\cdot\overline{D}) + A$$
$$= (S\cdot\overline{D}) + A$$
$$= (S-D) + A$$

where $\overline{X}$ represents the complementary if X, + represents the union, · represents the intersection, and – the subtraction (or cut).

This means that priority swap is equivalent to reverse operations order. For completeness, this result is detailed for the alternate simple structure in which "add material" has the highest priority. The start structure is (S−D)+A. Swapping priority yields (S−D)+(A−D), which is equal to (S+A)−D as proven below.

$$(S-A)+(A-D) = (S \cdot \overline{D})+(A \cdot \overline{D})$$
$$= (S+A) \cdot \overline{D}$$
$$= (S+A)-D$$

For consistency, the "swap priority" concept is now reformulated in terms of context-free grammar. Using the notations of U.S. Pat. No. 7,495,662, the context free grammar defining the simple seed structure of the examples above is $$X = \{\delta, +, -, A, B, C, D, E, \ldots\}$$

$$V = \{\tilde{S}, stock, add, remove\}$$

$$P_0 = \{\tilde{S} \mapsto stock\delta + add\delta + \delta^2 + remove\delta + \delta^2 -\}$$

$$P_1 = \begin{cases} stock \mapsto Zstock\delta, \\ add \mapsto Zadd\delta, \\ remove \mapsto Zremove\delta; Z \in \{A, B, C, D, E \ldots\} \end{cases}$$

$$P = P_0 \cup P_1$$

Terminal symbol δ is a syntactical characteristic that counts the number of children nodes under a parent node; it is used for building a tree isomorphic to a word of the grammar.

After creating the seed structure through the starting substitution $P_0 = \tilde{S} \mapsto stock\delta + add\delta + \delta^2 + remove\delta + \delta^2 -$, symbolic substitutions corresponding to the creation steps are:

stock ↦ Sstockδ add ↦ Aaddδ remove ↦ Dremoveδ add ↦ Baddδ add ↦ Caddδ remove ↦ Eremoveδ

Figure 12:
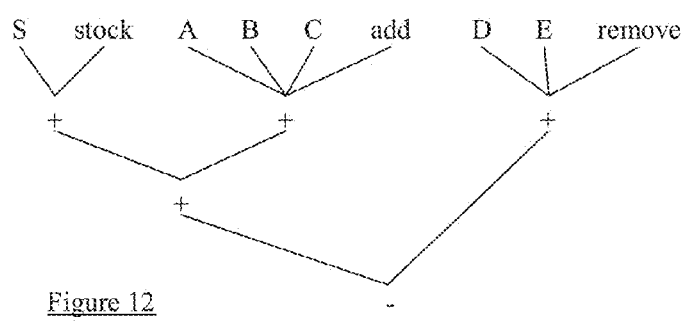
FIG. 12-15 show examples of trees corresponding to words produced with a grammar used in the examples of FIGS. 6-11.

This yields the word Sstockδ²+ABCaddδ⁴+δ²+DEremoveδ³+δ²− capturing the design intent and isomorphic to the tree of FIG. 12.

The grammar defined above allows a default priority order between design features. Permitting the use of the "swap" feature requires the following adjustment to the grammar.

$$X = \{\delta, +, -, A, B, C, D, E, \ldots\}$$

$$V = \{\tilde{S}, stock, add, remove, T\}$$

$$P_0 = \{\tilde{S} \mapsto stock\delta + add\delta + \delta^2 + remove\delta + \delta^2 -\}$$

$$P_1 = \begin{cases} stock \mapsto Zstock\delta, \\ add \mapsto Zadd\delta, \\ remove \mapsto ZT\delta + \delta^2 - remove\delta, \\ T \mapsto ZT\delta; Z \in \{A, B, C, D, E, \ldots\} \end{cases}$$

$$P = P_0 \cup P_1$$

An additional non terminal symbol T is needed and, when the part is modeled by a remove feature, instead of substitution remove ↦ Zremoveδ one uses substitution remove ↦ ZTδ+δ²−removeδ to anticipate the potentiality of removing solid contributions to each contribution added to the remove node. Swapping a remove feature with, for example, an add feature is actually done through adding a swap rule to the set of rules: the substitution T ↦ ZTδ.

More generally, several swap rules may be required for a swap feature. This is the case when features consist in several contributions, as in later examples. In that case, the modification of the priority is achieved by adding swap rules to the set of rules. The same applies for un-swap features which can be implemented by several un-swap rules. In the following, it is however considered without loss of generality that one swap (resp. un-swap) is added to the set of rules for performing a swap (resp. un-swap).

Figure 13:
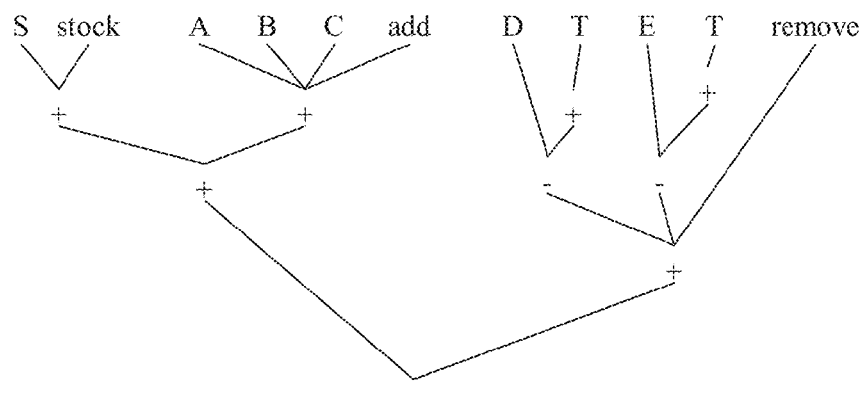

Back to the above example, the enhanced structure is Sstockδ²+ABCaddδ⁴+δ²+DTδ+δ²−ETδ+δ²−removeδ³+δ²− isomorphic to the tree of FIG. 13.

Figure 14:
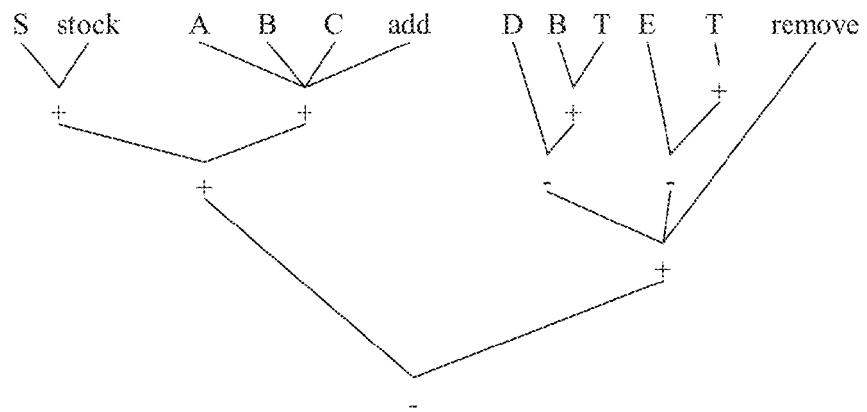

For geometrical evaluation, non terminal symbols remaining in the word, such as stock, add, remove and T behave like the empty set. Swapping B and D priority is to apply the substitution T ↦ BTδ to the occurrence of T attached to contribution D. This yields Sstockδ²+ABCaddδ⁴+δ²+DBTδ²+δ²−ETδ+δ²−removeδ³+δ²− which corresponds to the tree of FIG. 14.

Figure 15:
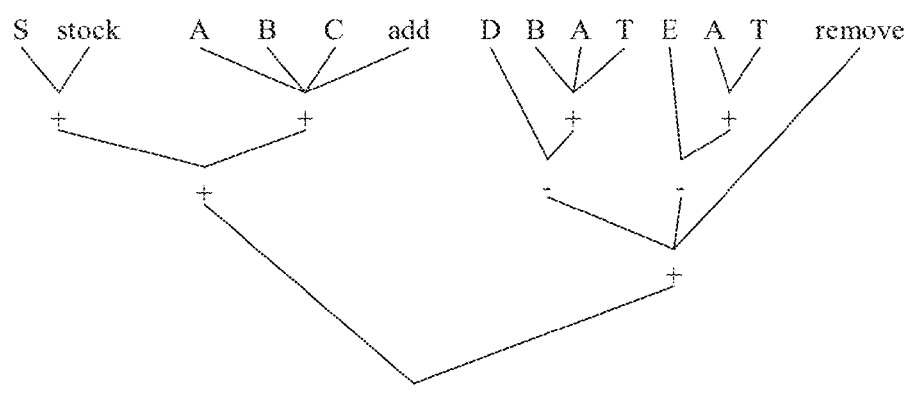

Swapping D and A priority, then A and E priority is done by T ↦ ATδ to T symbols attached to contributions D and E, yielding Sstockδ²+ABCaddδ⁴+δ²+DBATδ³+δ²−EATδ²+δ²−removeδ³+δ²− which corresponds to the tree of FIG. 15. Un-swapping priority of B and D requires two steps. First, transform the word Sstockδ²+ABCaddδ⁴+δ²+DBATδ³+δ²−EATδ²+δ²−removeδ³+δ²− into Sstockδ²+ABCaddδ⁴+δ²+DABTδ³+δ²−EATδ²+δ²−removeδ³+δ²− by changing BATδ³+ into ABTδ³+. This is allowed because "+" is a commutative and associative operation (because the union is commutative and associative). Then, applying the backward symbolic substitution BTδ ↦ T, which is an un-swap rule, yields the expected result.

Sstockδ²+*ABC*addδ⁴+δ²+D*AT*δ²+δ²−*EAT*δ²+δ²−removeδ³+δ²−.

The previous modifications of the priority order related to the swap concept. A different situation is: at the step of modifying the priority order, a bring-to-front rule or a send-to-back rule may be added to the set of rules, upon which the priority order is modified. This provides higher flexibility to the designer.

Figure 16:
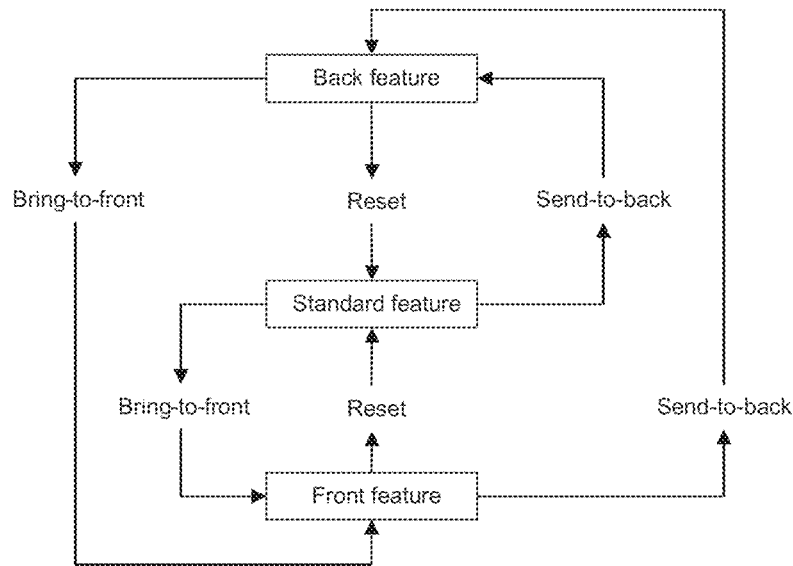
FIG. 16 illustrates the principle of bring-to-front and send-to-back operations.

For design purpose, it may be useful that the priority of a feature is always higher (resp. lower) than the priority of any other feature, including past (in time) and future (in time) features. This is achieved by the bring-to-front (resp. send-to-back) rule defining a bring-to-front (resp. send-to-back) feature. The chart of FIG. 16 illustrates this principle. A "standard" feature typically behaves according to the default priority order determined by the seed structure and the rules of the grammar. A "back" feature is a feature which has been given a low priority by the designer. A "front" feature is a feature which has been given a high priority by the designer.

From the theoretical point of view, this could be solved by dynamical priority swaps. It is not realistic because creating a front feature requires a dynamical update of all subsequent features.

The alternate solution is to add nodes to the seed structure dedicated to "front" or "back" features. Within the seed structure, back features nodes are located after the stock and before the stiffeners, front features nodes are located after the "push"

nodes and before the "cut" node. Providing such bring-to-front or a send-to-back rules for modifying the priority order saves computer resources.

The method may further comprise a reset operation which modifies the priority order. The reset operation may simply cancel the rules added by bring-to-front and bring-to-back operations. The reset may conversely keep track of those rules while canceling their effect (i.e. preventing them from being used when displaying the representation of the part).

Given the concept of back and front features, the question is how to manage relative priority of two back features of different types. For example, referring to the example above, an add feature and a remove feature are both sent to back. The default behavior is to maintain their relative default priority: the priority of the (back) "remove" is higher than the priority of the (back) "add". Moreover, it is possible to swap their relative priority using the same strategy described for standard features. In other words, the following sequence of user interactions is allowed:

1. Create add feature $A_1$.
2. Create remove feature $R_1$.
3. Send $A_1$ to back.
4. Send $R_1$ to back.
5. Swap priorities of $A_1$ and $R_1$.

Figure 17:
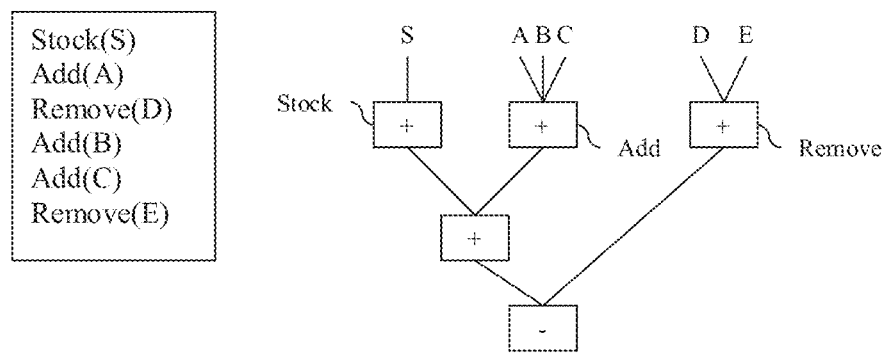
FIG. 17-19 illustrate seed structures and contributions for modifying the priority order.

A rigorous investigation is provided to compare the "swap" operation to "send to back" and "bring to front" operations. Suppose that features A, B and C have a lower priority that feature D. The key point is to ensure that the resulting geometry after swapping A and D, B and D, C and D is the same after sending D to back. The proof is given on the simple seed structure previously defined. After creating features A, B, C and D, the seed structure and contributions are as represented on FIG. 17.

Figure 18:
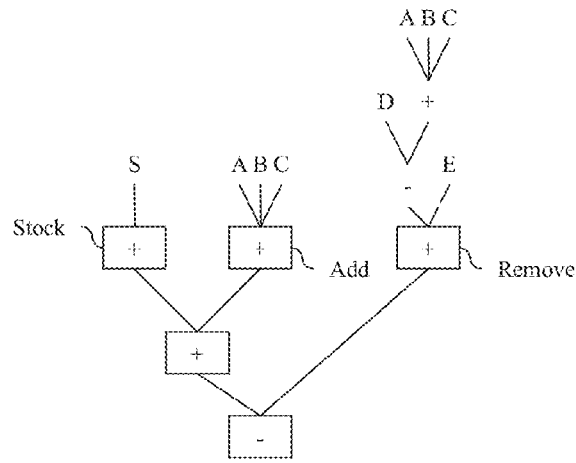

After swapping A and D, B and D, C and D, the seed structure and contributions are as represented on FIG. 18.

The next computation proves that this is equivalent to remove solid D after solid S and before adding A, B and C, thus justifying a low priority node "back features" containing solid D. For short, $X := A+B+C$.

$$(S + (A + B + C)) - ((D - (A + B + C)) + E) = (S + X) - ((D - X) + E)$$
$$= (S + X) - ((D \cdot \overline{X}) + E)$$
$$= (S + X) \cdot \overline{((D - \overline{X}) + E)}$$
$$= (S + X) \cdot \overline{((D - \overline{X})} \cdot \overline{E})$$
$$= (S + X) \cdot ((\overline{D} - X) \cdot \overline{E})$$
$$= ((S + X) \cdot (\overline{D} - X)) \cdot \overline{E}$$
$$= \left( \begin{array}{c} ((S + X) \cdot \overline{D}) + \\ ((S + X) \cdot X) \end{array} \right) \cdot \overline{E}$$
$$= \left( \begin{array}{c} (S + \overline{D}) + (X \cdot \overline{D}) + \\ (S \cdot X) + X \end{array} \right) \cdot \overline{E}$$
$$= ((S \cdot \overline{D}) + X) \cdot \overline{E}$$
$$= ((S - D) + X) - E$$
$$= ((S - D) + (A + B + C)) - E$$

Figure 19:
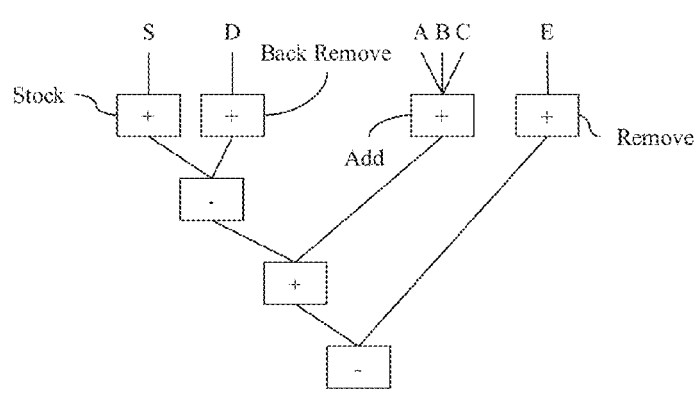

The very last formula is equivalent to the structure and contributions represented on FIG. 19.

As in the case of swap and un-swap, bring-to-front and send-to-back operations may be implemented by more than one rule.

Consequently, the seed structure may be equipped with new nodes to support "send-to-back" and "bring-to-front" operations as well as "swap" operations within back or front features. This is a straightforward extension of the initial seed structure. Nodes naming may be: Back Add, Back Remove, Front Add, Front Remove.

Rules defining a bring-to-front or a send-to-back operation are not clarified here, as they are easily accessible to the one skilled in the art in light of the explanations related to swap rules.

The method has been described with reference to a simple example, where a part is designed with a few basic features (stock, add, and remove). In the following, the method is described with reference to a specific field of application.

Each design feature modeling the part has a type which belongs to a group comprising:
   stock feature type,
   push feature type,
   contact feature type,
   stiffener feature type,
   cut feature type, and
   surface extraction feature type.

Possibly, the method comprises a step of defining the features modeling the part by selecting a type among the above group. Preferably, the group is at the disposal of the designer. In other words, the software used by the designer has capabilities for modeling the part with a feature of any of the above feature types.

The advantage of the above group is to provide an intuitive and comprehensive panel of features for designing a part for the particular field of car body. Thus, the invention allows intuitive car body design using a computer aided design system. Precisely, the "body-in-white" phase is particularity addressed, including sheet metal parts as well as production stamping dies. Features of the above group are referred to as "body-in-white" features.

Figure 20:
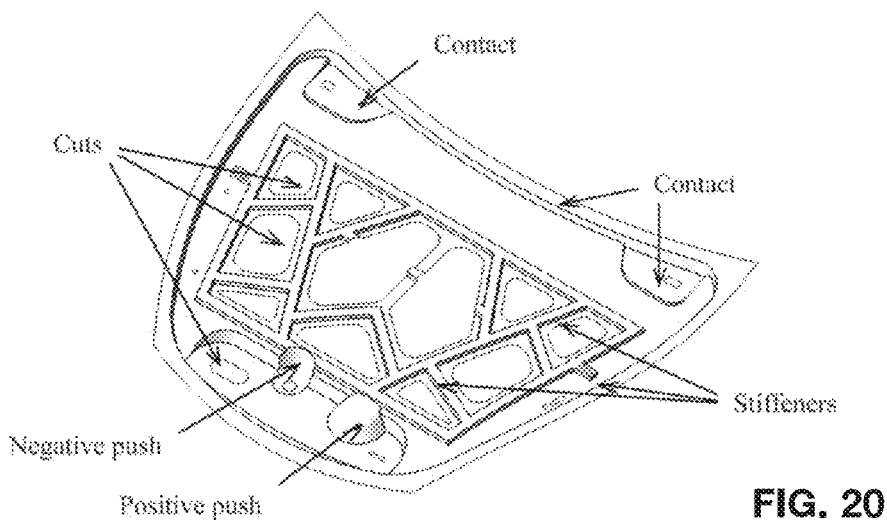
FIG. 20-25 show examples of body-in-white features.

"Body-in-white" (or BiW) refers to the stage in automobile manufacturing in which the car body sheet metal (including doors, hoods, and deck lids) has been assembled or designed but before the components (chassis, motor) and trim (windshields, seats, upholstery, electronics, etc.) are added. A BiW part is represented in FIG. 20.

Input data for design with "body in white" features may include the styling surface and at least one stamping direction. A stamping direction is a direction for defining parameters of the features modeling the part. By convention and for simplicity, one stamping direction, the z axis, is used throughout the following, but it can be any direction. The stamping direction is shared by almost all features. If it is changed during the design, features are updated according to the new direction.

The styling surface is the starting shape of the sheet part. The designer's skill is to trim and combine features to this basic shape so that functional specification is fulfilled.

Figure 21:
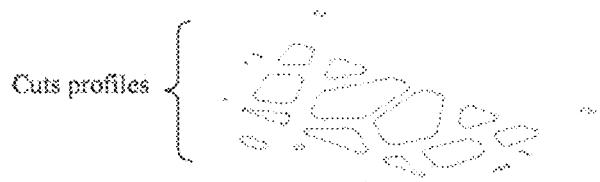
Figure 21:
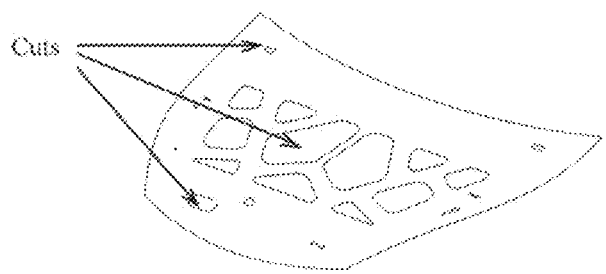
Figure 22:
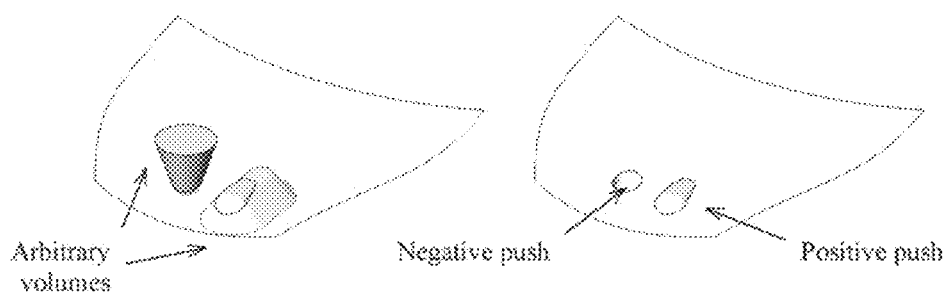
Figure 23:
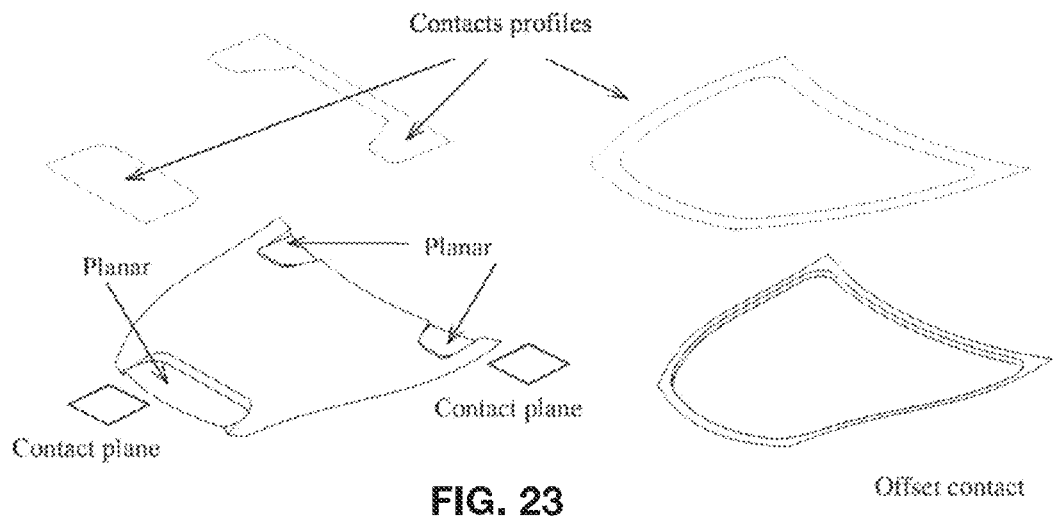
Figure 24:
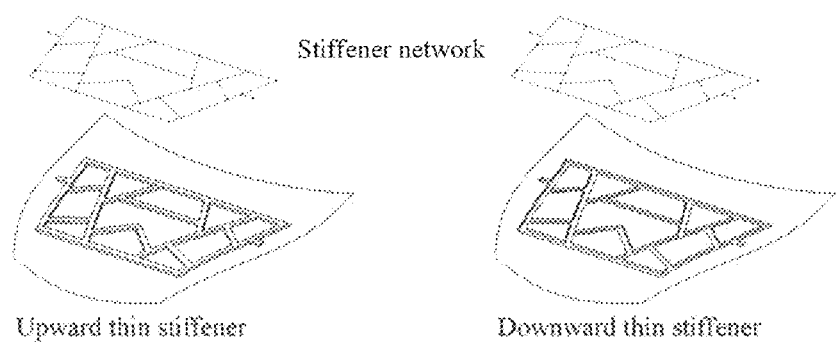
Figure 25:
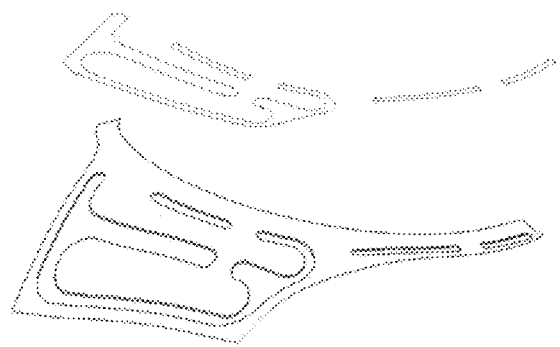

BiW features are now discussed with reference to FIGS. 20-25. FIG. 20 provides an example of a BiW part with cut, contact, negative push, positive push and stiffener features. FIG. 21 provides an example of cut features on the part of FIG. 20. FIG. 22 provides an example of negative and positive push features on the part of FIG. 20. FIG. 23 provides an example of a contact feature on the part of FIG. 20. FIG. 24 provides an example of upward and downward thin stiffener feature on the part of FIG. 20. FIG. 25 provides an example of a thick stiffener feature on another part.

By definition, a cut feature (or "cut") removes material from the sheet part. It punches an inside hole or trims its border. In many cases, the shape of the hole is a profile and the hole is punched extruding this profile along the stamping direction. A cut is used to create: weight reduction, drainage, space reservation, gate, fixture equipment on the sheet, fixture or position the sheet on the die. Exceptionally, and for special purpose, a cut can be an arbitrary volume that is removed from the sheet part.

By definition, through a push feature (or "push"), the sheet part is deformed in order to avoid a region of space. Typically, this region is (or will be) occupied within the vehicle by another device that must not collide the sheet part. Whether the sheet part is deformed from bottom to top (positive push) or from top to bottom (negative push) is the designer's decision. Input data for a push is an arbitrary volume together with the spec "up" or "down" according to the stamping direction. An optional clearance distance d can be specified so that the distance between the resulting sheet part and the input volume is not smaller than d.

By definition, a contact feature (or "contact area") is a surface connected to the main sheet. It is the common area between the sheet part and some other device or part. It can be a landing zone or a fixing zone. A contact surface is usually defined by a planar profile, but it can be any piece of surface, including an offset of the styling surface, provided it is not folded with respect to the stamping direction.

By definition, a stiffener feature (or "stiffener") is an embossed feature in a sheet metal work piece which is added to make the part more rigid. The resulting stiffener runs between the styling surface and an offset of the styling surface. A thin stiffener is defined by a planar network of lines or curves running on the styling surface and a thickness. A thick stiffener is defined by planar closed areas and the styling surface is locally offset above these closed areas.

Defining such features, the method is adapted to be used for designing a body-in-white part. The seed structure and the set of rules may also define a default priority order between the features according to their respective type. A stiffener feature has a lower default priority than a contact feature, which itself has a lower default priority than a push feature, which itself has a lower default priority that a cut feature. This precise default order is ideal for body-in-white design, as it is the closest to body-in-white designers' intent.

Figure 26:
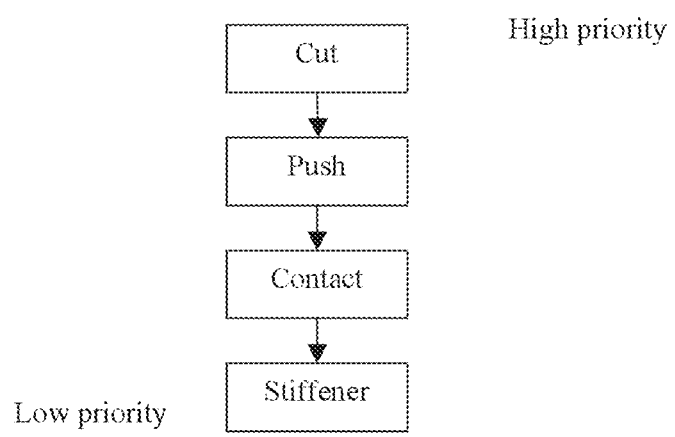
FIG. 26 illustrates the default priority order between body-in-white features.

By default, the relative priority of features is defined as follows. Cut priority is higher than all others. Push priority is higher than contact and stiffener. Contact priority is higher than stiffener. This means that in case of spatial overlapping, a cut trims any other feature; a push trims a contact or a stiffener and a contact trims a stiffener. Priorities are captured by FIG. 26.

Figure 27:
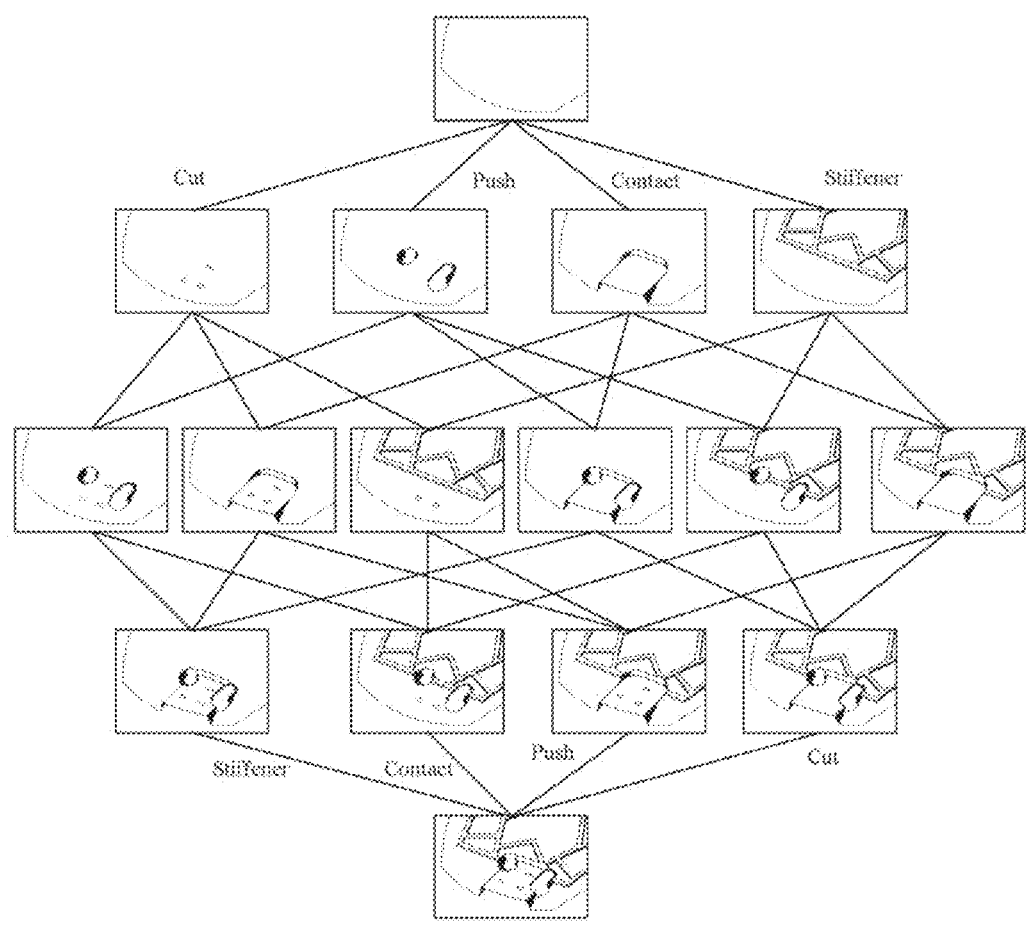
FIG. 27 illustrates that, given four design features, all possible sequence orders lead to the same result, and that whatever this sequence can be, the system always computes the resulting geometry.

Two main properties of the invention are illustrated by FIG. 27. Firstly, the system is adapted to compute a geometrical result even in case of complex and multiple overlap of features and whatever the ordered sequence can be. Secondly, the final result does not depend on feature creation order. The system is thus declarative. This is why all the paths from top to bottom in the graph, representing different creation orders of a cut feature, a push feature, a contact feature and a stiffener feature, end at the same point.

Figure 28:
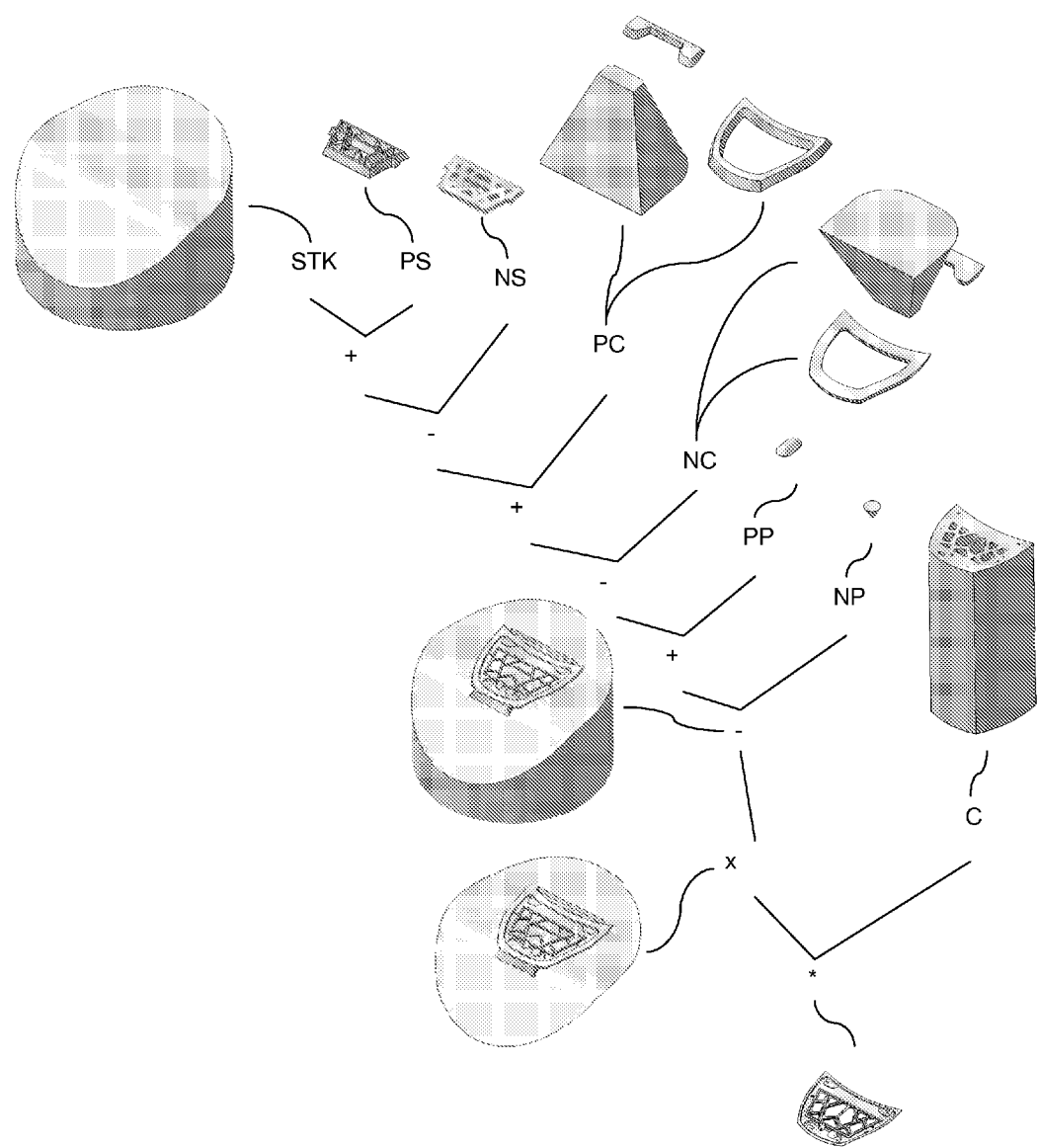
FIG. 28-29 illustrate a seed structure for designing body-in-white parts.

A seed structure particularly adapted to the design of body-in-white parts is now described with reference to FIG. 28.

For simplicity, the stamping direction is the vertical direction, which does not restrict the generality.

The "body in white" seed structure starts with a solid stock created from the input surface. This surface, provided by the designer, is the (possibly untrimmed) styling surface on which the features must be implemented. The stock solid is the extrusion of the input surface in the stamping direction, up to a horizontal plane sufficiently low (named "bottom plane" below). This contribution feeds node STK.

A positive push is to add the input volume to the stock. This contribution feeds node PP. A negative push is to remove the input volume from the stock. This contribution feeds node NP.

A contact is generally defined by a planar profile. A solid contribution is created by extruding and drafting this profile down to a downward translation of the input surface. The value of this translation is discussed later. This solid contribution is added to the stock. This contribution feeds node PC. Another solid contribution is created by extruding the input profile up to an upward translation of the input surface. This solid contribution is removed from the stock. It feeds node NC. Same definition holds for an offset contact or a surface contact: a downward and an upward solid contribution respectively added to and removed from the stock.

A stiffener is defined with a downward solid extrusion added to the stock (it feeds node PS) and an upward solid extrusion removed from the stock (it feeds node NS). Same definition holds for thin or thick stiffeners.

A cut is defined by a planar profile that is not parallel to the stamping direction. This profile is extruded along the stamping direction up to a sufficiently high plane (the "top plane" discussed later) and down to the bottom plane. This contribution feeds node C.

After all the push, contact and stiffener solid contributions are added to and removed from the stock, the top surface of the modified solid stock is extracted. This extraction can be facilitated by intersecting the modified solid stock with a solid extrusion of the input styling surface up to the top plane and down to the bottom plane. This top surface is then trimmed by the cut solid. Alternatively, one may obtain the same result by cutting from the modified solid stock the complementary of the solid extrusion. This eliminates unwanted slivers.

Contributions of each feature are applied linearly to the stock solid in the reverse default priority order between the features. This is from the top to the bottom of the seed structure as represented in FIG. 28. This way, the first contribution (low priority) is trimmed by the next contribution and so until the very last contribution (highest priority). These principles yield the seed structure of FIG. 28.

The body-in-white context free grammar (BiW grammar) is now described in details. This grammar is adapted to perform the functionalities described with reference to FIG. 28, as is now detailed. Terminal symbols are $X=\{\delta,x,+,-,A,B,C,D,E,\ldots\}$ where $\delta$ captures the number of inputs symbols to an operation, $x,+,-$ are the operations, respectively surface extraction, union, subtraction, (equivalent union symbol is $\cup$)

$A,B,C,\ldots$ are volumes.

Non terminal symbols are $V=\{\tilde{S},stk,ps,ns,pc,nc,pp,np,c,T\}$ where $\tilde{S}$ is the start symbol, $stk,ps,ns,pc,nc,pp,np,c$ recall design feature types (stock, positive and negative stiffener contributions, positive and negative contact contributions, positive and negative push contributions, cut contributions). In fact these symbols may be indexed in order to designate all the occurrences of a feature type, T is the management priority symbol.

Symbolic substitutions are defined as follows. The very first substitution creates the seed structure $\tilde{S} \mapsto stk\delta+ps\delta+\delta^2+ns\delta+\delta^2-pc\delta+\delta^2+nc\delta+\delta^2-pp\delta+\delta^2+np\delta+\delta^2-\delta xc\delta+\delta^2-$ which corresponds to the tree of FIG. 28.

Next substitution creates the stock solid. No priority management is required yet.

$stk \mapsto Zstk\delta$ $Z \in \{A,B,C,D,E,\ldots\}$

Next substitutions add contributions of other features. They do require priority management capability through symbol T, as explained later.

$$ps \mapsto ZT\delta + \delta^2 - ps\delta$$

$$ns \mapsto ZT\delta + \delta^2 - ns\delta$$

$$pc \mapsto ZT\delta + \delta^2 - pc\delta$$

$$nc \mapsto ZT\delta + \delta^2 - nc\delta$$

$$pp \mapsto ZT\delta + \delta^2 - pp\delta$$

$$np \mapsto ZT\delta + \delta^2 - np\delta$$

$$c \mapsto ZT\delta + \delta^2 - c\delta$$

$$T \mapsto ZT\delta$$

$$Z \in \{A, B, C, D, E, \ldots\}$$

According to the theory the consistency of the formula defining the seed structure is proven by a step by step creation from a meta-grammar. The meta-grammar is the following:

$$\overline{X} = \{\delta\} \cup A$$

$$\overline{V} = \{\overline{S}, \overline{T}\}$$

$$\overline{P} = \begin{cases} \overline{S} \mapsto \overline{ST\delta S}, \\ \overline{T} \mapsto \overline{ST\delta}, \\ \overline{T} \mapsto 1 \end{cases} \cup \{\overline{S} \mapsto x, x, \in A\}$$

where $A = X \cup V$ is the set of terminal and non terminal symbols of the application ("body in white" for instance) grammar. All steps are listed in Annex A for information. The sequence of Annex A is not unique.

The seed structure may be edited by the software engineer or a skilled designer through this meta-grammar. This allows adapting the seed structure to specific needs. For example, the default behavior (i.e. the default priority order) can be changed for all push features by switching push "adds" and push "removes" in the seed structure. This decision is made during the seed structure design, according to application criteria.

Feature instantiation in the BiW grammar is now discussed.

A stiffener contributes to the sheet part through two volumes, $S^+$ and $S^-$ respectively added to and removed from the stock. Inserting these contributions in the seed structure is done through the following sequence of symbolic substitutions.

$$ps \mapsto S^+ ps\delta$$

$$ns \mapsto S^- ns\delta$$

Figure 30:
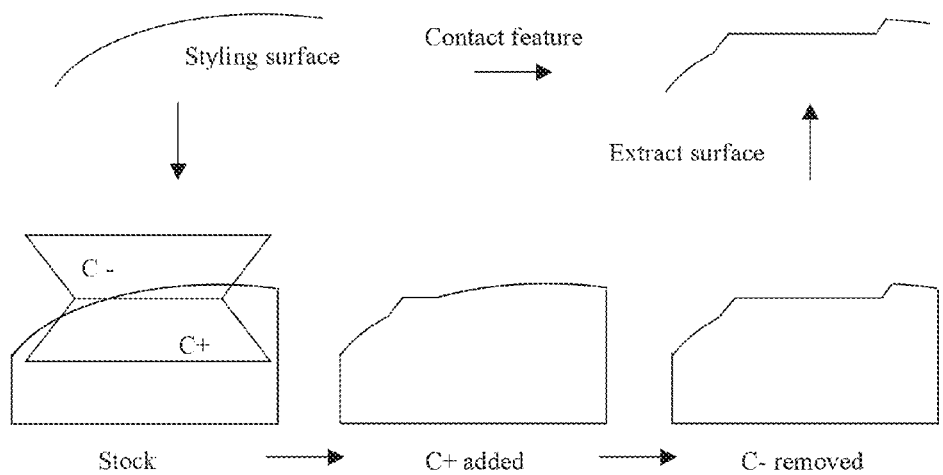
FIG. 30 illustrates the contributions of a contact feature.

A contact contributes to the sheet part through two volumes, $C^+$ and $C^-$ respectively added to and removed from the stock. Inserting these contributions in the seed structure is done through the following sequence of symbolic substitutions and is exemplified by FIG. 30.

$$pc \mapsto C^+ T\delta + \delta^2 - pc\delta$$

$$nc \mapsto C^- T\delta + \delta^2 - nc\delta$$

A positive push contributes to the sheet part through one volume, say $P^+$ added to the stock. Inserting this contribution in the seed structure is done through the following symbolic substitution.

$$pp \mapsto P^+ T\delta + \delta^2 - pp\delta$$

A negative push contributes to the sheet part through one volume, say $P^-$ removed from the stock. Inserting this contribution in the seed structure is done through the following symbolic substitution.

$$np \mapsto P^- T\delta + \delta^2 - np\delta$$

A cut contributes to the sheet part through one volume, say C removed from the extracted surface. Inserting this contribution in the seed structure is done through the following symbolic substitution.

$$c \mapsto ZT\delta + \delta^2 - c\delta$$

Figure 29:
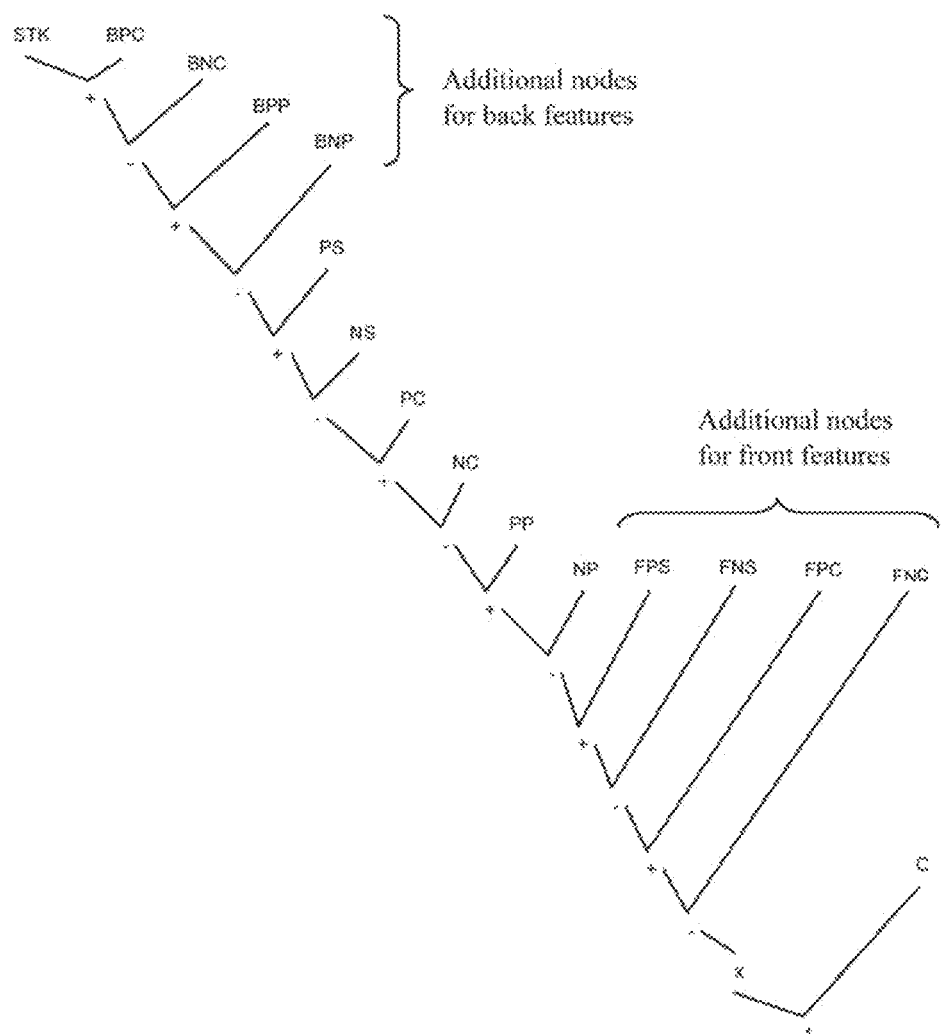

As previously mentioned, it is also possible to create new nodes on the seed structure for managing bring-to-front and send-to-back operations. Despite these additional nodes could be created dynamically, it is more convenient to include them in the basic seed structure. This is illustrated in FIG. 29.

Figure 31:
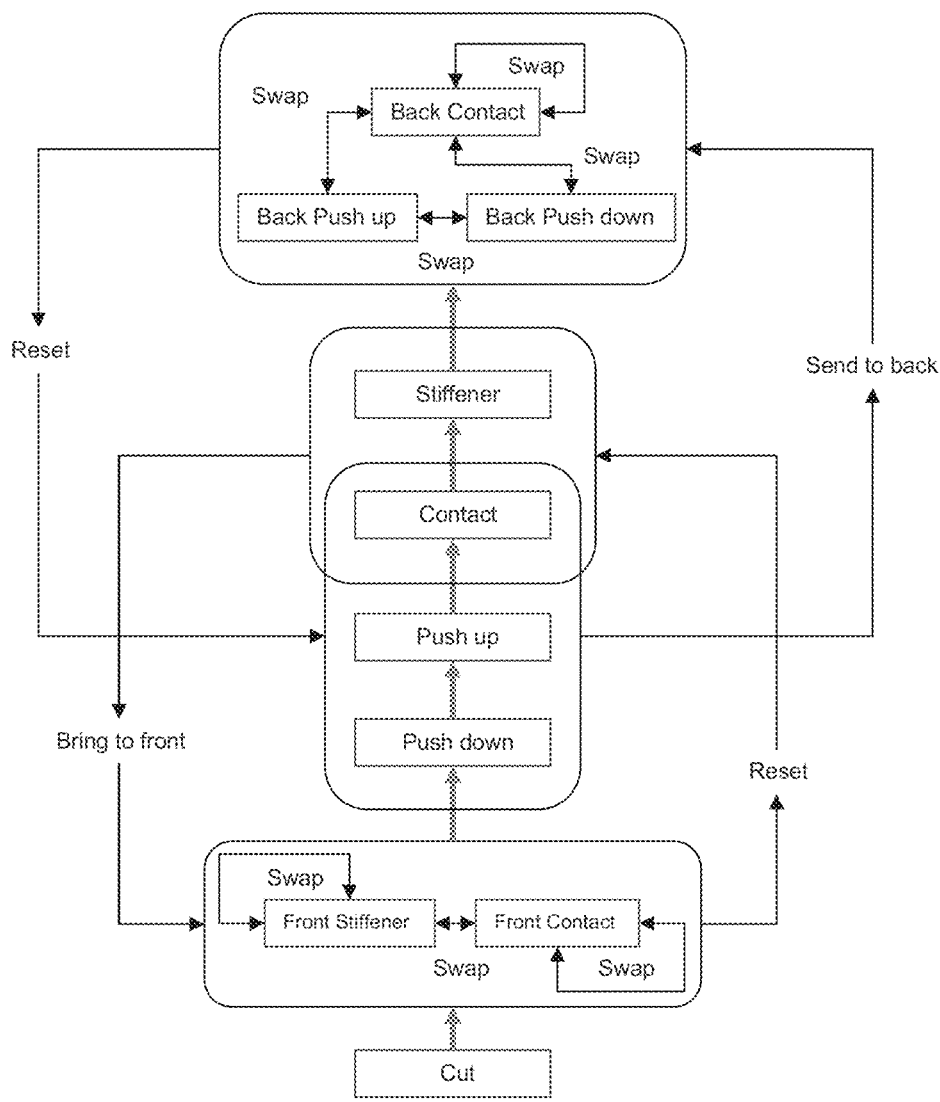
FIG. 31 shows possibilities for modifying the priority order between body-in-white features.

The chart of FIG. 31 gathers all possibilities mixing "bring-to-front", "send-to-back", "swap" and "reset" commands. In light of the above explanations, other commands possibly more sophisticated may be used for modifying the priority order between features modeling a part.

Priority management between BiW features is now discussed with reference to FIGS. 32-35. Notably, how to manage the priority between two features of the same type is discussed. Also, how to modify a priority order between two BiW features is now discussed.

Priority management is design intent and is captured in a similar manner as design features. In other words and as mentioned through the previous discussions, swapping the priority between two design features is for the designer to create a "swap" feature and feed it with two design features.

As highlighted earlier, features may apply one or more contributions to the part (each contribution corresponding to a rule of the set of rules modeling the part). Notably, BiW features apply one or two contributions.

Figure 32:
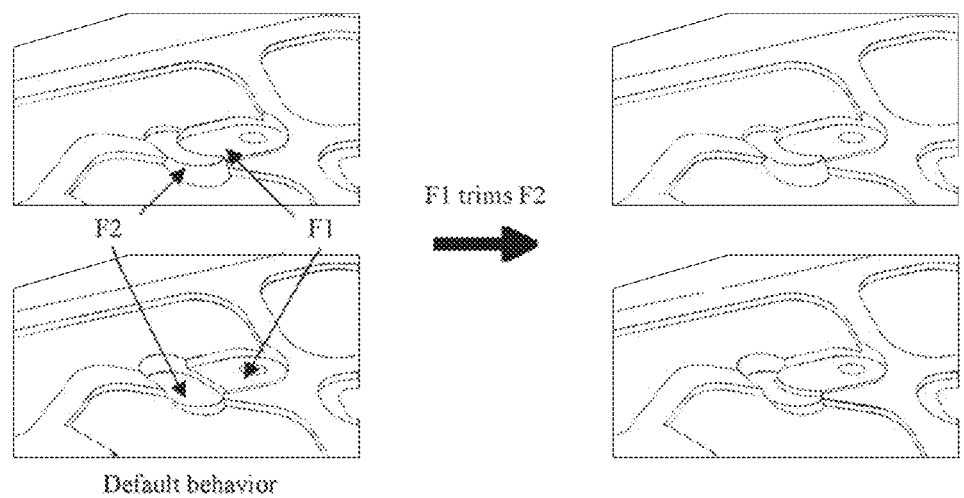
FIG. 32-35 illustrate priority management between body-in-white features.
Figure 33:
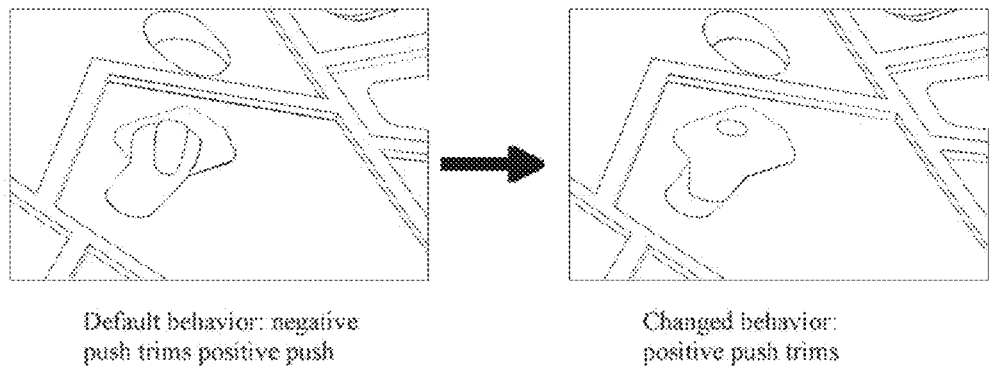

Overlapping algebras are first discussed with reference to FIGS. 32-33. They deal with two features of the same type, each contributing to the seed structure through two volumes, one being added to the stock and the other being removed from the stock. Only stiffeners and contacts fit this definition. Overlapping algebra provides all possibilities of mixing two such features.

The algebra of 2-contributions overlapping BiW features is first discussed with reference to FIG. 32.

For clarity, the following is written in terms of contact features, but it is also true for stiffener features. Let $F_1$ and $F_2$ be two contacts, and $F_1^+$, $F_1^-$, $F_2^+$, $F_2^-$ their respective contributions. Volume $F_i^+$ is added to the stock and volume $F_i^-$ is removed from the stock. When contacts $F_1$ and $F_2$ overlap, a default behavior (represented on the leftmost part of FIG. 32) may compute $\min(F_1, F_2)$, which means that the lower contact trims the upper contact. This is because contact subtractions are performed after contact additions by the seed structure. Nevertheless, the result $\max(F_1, F_2)$ can be obtained by removing $F_2^+$ from $F_1^-$ and removing $F_1^+$ from $F_2^-$. Formally, this is done through the following sequence of substitutions:

$$F_1^- T\delta + \delta^2 - \mapsto F_1^- F_2^+ T\delta^2 + \delta^2 -$$

$$F_2^- T\delta + \delta^2 - \mapsto F_2^- F_1^+ T\delta^2 + \delta^2 -$$

Finally, the modified behavior "$F_1$ always trims $F_2$" (represented on the rightmost part of FIG. 32) may be obtained by removing $F_1^+$ from $F_2^-$, which is done through the following substitution.

$$F_2^- T\delta + \delta^2 - \mapsto F_2^- F_1^+ T\delta^2 + \delta^2 -$$

The above rules provide swap rules to add to the set of rules modeling the part for modifying the default priority order between two 2-contributions features of the same type.

The algebra of 1-contributions overlapping BiW features is now discussed with reference to FIG. 33. This is dedicated to the push feature. Indeed, the cut feature is naturally commutative, and thus, priority management between two cut features need not be addressed.

Positive and negative pushes have the same priority with respect to other features. Nevertheless, when they overlap, the default behavior (represented on the leftmost part of FIG. 33) is to trim the positive push by the negative push because the seed structure performs push subtractions after push additions. This default behavior can be changed for all push features by switching push "adds" and push "removes" in the seed structure. This decision is made during the seed structure design, according to application criteria. The priority order determined by the default behavior can be changed. Let $P^+$ and $P^-$ be a positive push and a negative push. The behavior change (represented on the rightmost part of FIG. 33) is obtained by removing $P^+$ from $P^-$, as specified by the following swap rule which may be added to the set of rules:

$$P^- T\delta + \delta^2 - \mapsto P^- P^+ T\delta^2 + \delta^2 -$$

Figure 34:
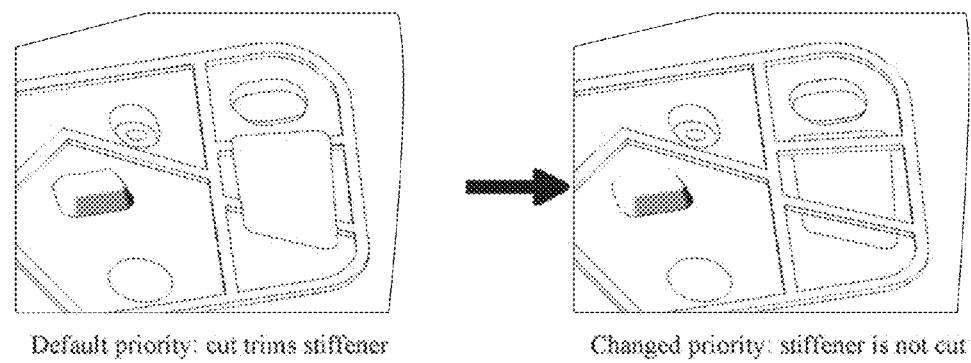
Figure 35:
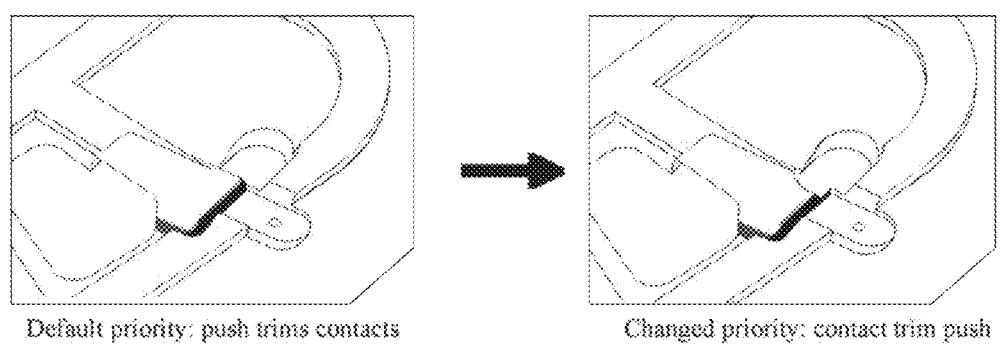

Management of priority between two features of different types is now discussed with reference to FIGS. 34-35.

The management of the priority between a stiffener feature and a contact feature is first discussed. Let S be a stiffener, $S^+$, $S^-$ its contributions. Let C be a contact, $C^+$, $C^-$ its contributions. By default, contact C trims stiffener S. Reversing this priority (stiffener S trims contact C) is obtained by removing $S^-$ from $C^+$ and removing $S^+$ from $C^-$, which is obtained through the following sequence of substitutions.

$$C^+ T\delta + \delta^2 - \mapsto C^+ S^- T\delta^2 + \delta^2 -$$

$$C^- T\delta + \delta^2 - \mapsto C^+ S^+ T\delta^2 + \delta^2 -$$

The management of the priority between a stiffener feature and a positive push feature is now discussed. Let S be a stiffener, $S^+$, $S^-$ its contributions. Let $P^+$ be a positive push. By default, push $P^+$ trims stiffener S. Reversing this priority (stiffener S trims push $P^+$) is obtained by removing $S^-$ from $P^+$, which is obtained through the following substitution.

$$P^+ T\delta + \delta^2 - \mapsto P^+ S^- T\delta^2 + \delta^2 -$$

The management of the priority between a stiffener feature and a negative push feature is now discussed. Let S be a stiffener, $S^+$, $S^-$ its contributions. Let $P^-$ be a negative push. By default, push $P^-$ trims stiffener S. Reversing this priority (stiffener S trims push $P^-$) is obtained by removing $S^+$ from $P^-$, which is obtained through the following substitution.

$$P^- T\delta + \delta^2 - \mapsto P^- S^+ T\delta^2 + \delta^2 -$$

The management of the priority between a stiffener feature and a cut feature is now discussed with reference to FIG. 34. Let S be a stiffener, $S^+$, $S^-$ its contributions. Let K be a cut. By default, K cuts stiffener S. Reversing this priority (stiffener S is not cut by K) is obtained by removing $S^+$ and $S^-$ from K, which is done through the following sequence of substitutions.

$$KT\delta + \delta^2 - \mapsto KC^+ T\delta^2 + \delta^2 - \mapsto KC^+ S^- T\delta^3 + \delta^2 -$$

The management of the priority between a contact feature and a positive push feature is now discussed with reference to FIG. 35. Let C be a contact, $C^+$, $C^-$ its contributions. Let $P^+$ be a positive push. By default, push $P^+$ trims contact C. Reversing this priority (contact C trims push $P^+$) is obtained by removing $C^-$ from $P^+$, which is obtained through the following substitution.

$$P^+ T\delta + \delta^2 - \mapsto P^+ C^- T\delta^2 + \delta^2 -$$

The management of the priority between a contact feature and a negative push feature is now discussed. Let C be a contact, $C^+$, $C^-$ its contributions. Let $P^-$ be a negative push. By default, push $P^-$ trims contact C. Reversing this priority (contact C trims push $P^-$) is obtained by removing $C^+$ from $P^-$, which is obtained through the following substitution.

$$P^- T\delta + \delta^2 - \mapsto P^- C^+ T\delta^2 + \delta^2 -$$

The management of the priority between a contact feature and a cut feature is now discussed. Let C be a contact, $C^+$, $C^-$ its contributions. Let K be a cut. By default, K cuts contact C. Reversing this priority (contact C is not cut by K) is obtained by removing $C^+$ and $C^-$ from K, which is done through the following sequence of substitutions.

$$KT\delta + \delta^2 - \mapsto KC^+ T\delta^2 + \delta^2 - \mapsto KC^+ C^- T\delta^3 + \delta^2 -$$

The management of the priority between a positive push feature and a cut feature is now discussed. Let $P^+$ be a positive push. Let K be a cut. By default, K cuts push $P^+$. Reversing this priority (push $P^+$ is not cut by K) is obtained by removing $P^+$ from K, which is done through the following substitution.

$$KT\delta + \delta^2 - \mapsto KP^+ T\delta^2 + \delta^2 -$$

The management of the priority between a negative push feature and a cut feature is now discussed. Let $P^-$ be a negative push. Let K be a cut. By default, K cuts push $P^-$. Reversing this priority (push $P^-$ is not cut by K) is obtained by removing $P^-$ from K, which is done through the following substitution.

$$KT\delta + \delta^2 - \mapsto KP^- T\delta^2 + \delta^2 -$$

The management of priority between front and back features is now discussed. Creating a front feature is to contribute to dedicated front nodes instead of standard nodes. Creating a back feature is to contribute to dedicated back nodes instead of standard nodes. Sending to back a standard feature is to remove its contributions from standard nodes and move them to dedicated back nodes. Bringing to front a standard feature is to remove its contributions from standard nodes and move them to dedicated front nodes. Resetting a front or back feature is to remove its contributions from front or back nodes and move them to standard nodes.

The above discussion provides means for reversing the priority between two BiW features. Notably, as shown it is always possible to add one or more swap rules for modifying the default priority order between two features.

The method was described in a general aspect from the point of view of the CAD system. The system manages the seed structure and the set of rules in a back process while the designer creates (i.e. instantiates) features, typically through a graphical user interface. An action of the user through the graphical user interface results in a modification of the set of rules in the back process, as explained earlier. The encoding of the seed structure, of the rules, and the development of the graphical user interface is the role of the software engineer and is not described in details.

Implementation can take benefit of the invention by implementing solid modeling operations (union, intersection, subtraction etc.) as they are specified. This is a straightforward use of the invention. If surface modeling algorithms (mainly splitting and trimming) are preferred for the implementation, the invention helps specifying how to combine these surfacing operations by defining results as those obtained through solid modeling operations.

Rules are added for each contribution of a feature. These are internal parameters. When specifying features, the designer typically enters parameters values for specifying geometrical objects. The shape of a solid contribution is thus based on two types of inputs. On one hand, user defined objects (mainly profiles and thicknesses), and on the other hand, internal parameters and geometries. These internal inputs comprise:

- The bottom plane which is located far enough below the input surface. It defines the lower limit of cut contributions and the stock solid. It can be computed from the input surface enlarged bounding box.
- The top plane which is located far enough above the input surface. It defines the upper limit of cut contributions. It can be computed from the input surface enlarged bounding box.
- The upper surface which is an upward translation of the input surface. It defines the upper limit of drafted solid contributions (those of stiffeners and contacts) that are removed from the stock solid.
- The lower surface which is a downward translation of the input surface. It defines the lower limit of drafted solid contributions (those of stiffeners and contacts) that are added to the stock solid.
- Translation values of upper and lower surfaces which are related to the highest and lowest possible feature that can reasonably be applied on a BiW sheet part. Creating a feature beyond one of these surfaces does lead to a failure. The system creates a strange shape (unexpected cut, disconnected sheet part) interpreted by the user as a design error.

The method may be extended to other features adapted to "body in white" design. The seed structure described in the invention is potentially able to support other "body in white" features: flange feature for example. Designing a new feature is to set up and spread contributions through seed structure nodes. If existing nodes are not able to support a new feature, new nodes can be added to the seed structure while preserving existing features and behaviors.

The above elements are merely examples of applications of the invention. Notably, the seed structures disclosed are not uniquely defined. Indeed, different seed structures may lead to the same scheme of design (same contributions applied in the same default order). Said seed structures are said to be equivalent.

A seed structure can be viewed as an algebraic expression mixing operands and operations symbols through a precise syntax. Depending on operations properties (mainly commutation and distribution) another equivalent structure can exist. For example, the following set theoretic Boolean expression $(S \cup A) - R$ is equivalent to $(S-R) \cup (A-R)$ because one can be changed into the other, as proven by:

$$(S \cup A) - R = (S \cup A) \cap \overline{R} = (S \cap \overline{R}) \cup (A \cap \overline{R}) = (S-R) \cup (A-R)$$

Reformulated with post fixed convention, this means that seed structure $SA \cup R-$ is equivalent to seed structure $SR-AR- \cup$. Consequently, by definition, two seed structures are equivalent if one can be changed into the other using a sequence of algebraic manipulations. Allowed algebraic manipulations are consequences of the properties of the operations involved in the seed structure. In the previous example, the following definition and property are used: "removing a set to another set is to intersect the first one with the complement of the second one" and "intersection can be distributed over union".

An existing "body in white" sheet part designed with a traditional history based CAD system can be involved as the input surface, provided it is valid 2-manifold object. The shape will be trimmed by declarative features according to contributions and seed structure. On the other hand, the output surface resulting from the seed structure can be reused in a traditional CAD system since it is a valid 2-manifold object. Any further operation can be performed (drawing, offsetting, assembly, trimming, machining etc.) and associativity is preserved.

The invention is a contribution to the art notably because it specifies one or more of the following elements:

- A list of "body-in-white" features. Each feature is defined to fulfill a precise function that is meaningful to designers of "body-in-white" parts.
- Default behavior in case of features overlap. This defines how two and more features should trim each other when they occupy neighboring positions in 3D space. Whatever feature overlapping can be, the system always provides a geometrical solution.
- Local as well as global priority modification (i.e. change) when default behavior does not fit the design intent. Depending on the situation and/or on the implementation of the method, a priority change is captured as a feature's property or as a proper design feature.
- The specialized seed structure able to process said features according to said default behaviors and modified behaviors.
- History free design (i.e. declarative design): the resulting shape (computed by the seed structure fed by the "body in white" feature's contributions, i.e. the set of rules) does not depend on features creation order.

Thanks to these properties, the invention makes the "body in white" CAD system easier to learn and to use because the designer deals with the appropriate semantic. Internal complexity (mainly history of operations) is hidden. Quality is built in and history free property allows collaborative design.

The method may be performed with a CAD system. The computer-aided design system may comprise a database storing the part modeled by using a seed structure of a context-free grammar, a set of rules of the grammar, at least two design features, each design feature being defined by at least one rule of the set, and a priority order between the design features determined by the seed structure and the set of rules; the system may further comprise a graphical user interface suitable for performing the method detailed above.

A computer program may comprise instructions for execution by a computer, the instructions comprising means for performing the method with a graphical user interface of (comprised by) a computer-aided design system. The system further comprises a database storing a part modeled by a seed structure of a context-free grammar, a set of rules of the grammar, at least two design features, each design feature being defined by at least one rule of the set, and a priority order between the design features determined by the seed structure and the set of rules. Such a program may be used to update a CAD system so that it becomes suitable for performing the method of the invention.

As generally known in the art, such a program may be recorded on a computer readable storage medium.

Figure 36:
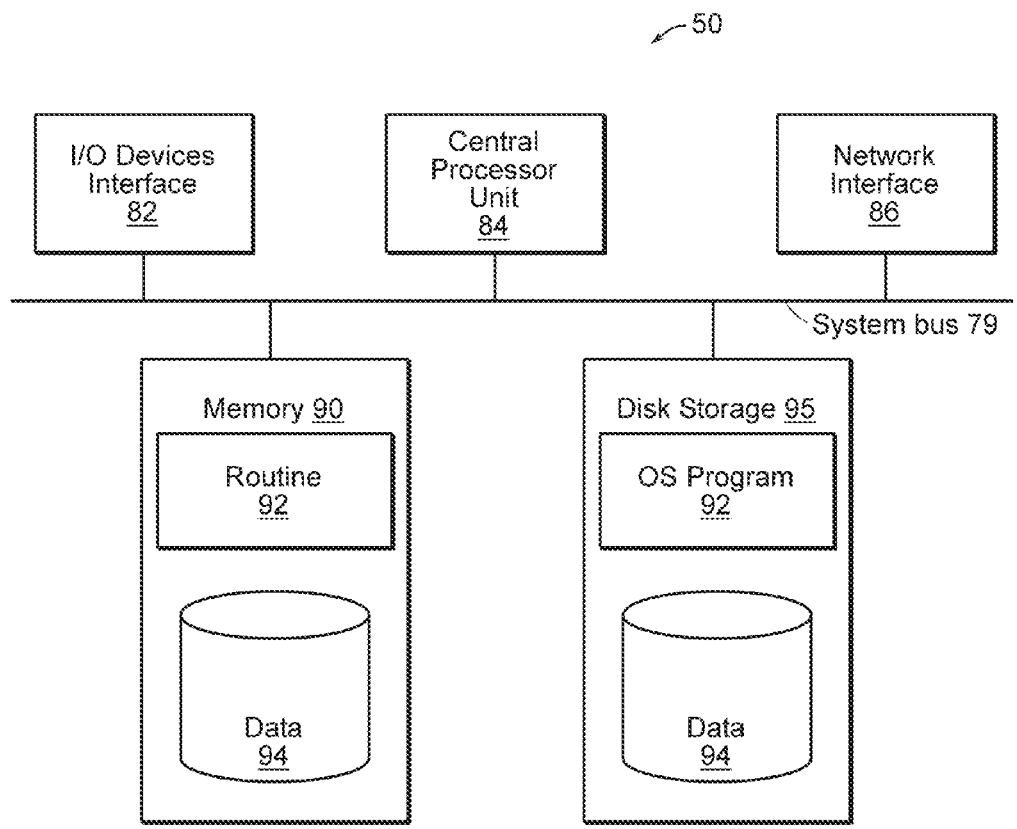
FIG. 36 is a block diagram of a computer implementing embodiments of the present invention.

FIG. 36 illustrates a computer 50 such as in a computer network or similar digital processing environment in which the present invention may be implemented.

The subject computer 50 may be a client computer(s)/devices and/or a server computer(s) providing processing, storage, and input/output devices executing application programs and the like. Client computer(s)/devices 50 can also be linked through communications network to other computing devices, including other client devices/processes 50 and server computer(s) 50. The communications network can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

FIG. 36 is a diagram of the internal structure of a subject computer 50 (e.g., client processor/device or server computers) in the computer system of an example embodiment. The computer 50 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50. Network interface 86 allows the computer to connect to various other devices attached to a network (e.g., above mentioned communications network). Memory 90 provides volatile storage for computer software instructions 92 and data 94 used to implement an embodiment of the present invention (e.g., seed structure, set of Rules, design features priorities order, modifier, user interface and supporting code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

ANNEX A $$\overline{S} \mapsto \overline{ST\delta S} \mapsto \overline{SST\delta^2 S} \mapsto \overline{SS\,T\delta^2} - \mapsto \overline{SS\delta^2} - \mapsto$$

$$\overline{SS\,T\delta S\delta^2} - \mapsto \overline{SS\,T\delta} + \delta^2 - \mapsto \overline{Sc T\delta} + \delta^2 - \mapsto$$

$$\overline{Sc\delta} + \delta^2 - \mapsto \overline{S\,T\delta S c\delta} + \delta^2 - \mapsto \overline{ST\delta x c\delta} + \delta^2 - \mapsto$$

$$\overline{S\delta x c\delta} + \delta^2 - \mapsto \overline{S\,T\delta S x c\delta} + \delta^2 - \mapsto \overline{SS\,T\delta^2 S\delta x c\delta} + \delta^2 - \mapsto$$

$$\overline{SS\,T\delta^2} - \delta x c\delta + \delta^2 - \mapsto \overline{SS\delta^2} - \delta x c\delta + \delta^2 - \mapsto$$

$$\overline{SS\,T\delta S\delta^2} - \delta x c\delta + \delta^2 - \mapsto \overline{SS\,T\delta} + \delta^2 - \delta x c\delta + \delta^2 - \mapsto$$

$$\overline{SS\delta} + \delta^2 - \delta x c\delta + \delta^2 - \mapsto \overline{S} n p\delta + \delta^2 - \delta x c\delta + \delta^2 - \mapsto$$

$$\overline{S\,T\delta S} n p\delta + \delta^2 - \delta x c\delta + \delta^2 - \mapsto$$

$$\overline{SS\,T\delta^2 S} n p\delta + \delta^2 - \delta x c\delta + \delta^2 - \mapsto$$

$$\overline{SS\,T\delta^2} + n p\delta + \delta^2 - \delta x c\delta + \delta^2 - \mapsto$$

$$\overline{SS\delta^2} + n p\delta + \delta^2 - \delta x c\delta + \delta^2 - \mapsto$$

$$\overline{SS T\delta S\delta^2} + n p\delta + \delta^2 - \delta x c\delta + \delta^2 - \mapsto$$

$$\overline{SS\,T\delta} + \delta^2 + n p\delta + \delta^2 - \delta x c\delta + \delta^2 - \mapsto$$

$$\overline{SS\delta} + \delta^2 + n p\delta + \delta^2 - \delta x c\delta + \delta^2 - \mapsto$$

$$\overline{S} p p\delta + \delta^2 + n p\delta + \delta^2 - \delta x c\delta + \delta^2 - \mapsto$$

$$\overline{S\,T\delta S} p p\delta + \delta^2 + n p\delta + \delta^2 - \delta x c\delta + \delta^2 - \mapsto$$

$$\overline{SS\,T\delta^2 S} p p\delta + \delta^2 + n p\delta + \delta^2 - \delta x c\delta + \delta^2 - \mapsto$$

$$\overline{SS\,T\delta^2} - p p\delta + \delta^2 + n p\delta + \delta^2 - \delta x c\delta + \delta^2 - \mapsto$$

$$\overline{SS\delta^2} - p p\delta + \delta^2 + n p\delta + \delta^2 - \delta x c\delta + \delta^2 - \mapsto$$

$$\overline{SS\,T\delta S\delta^2} - p p\delta + \delta^2 + n p\delta + \delta^2 - \delta x c\delta + \delta^2 - \mapsto$$

$$\overline{SS\,T\delta} + \delta^2 - p p\delta + \delta^2 + n p\delta + \delta^2 - \delta x c\delta + \delta^2 - \mapsto$$

$$\overline{SS\delta} + \delta^2 - p p\delta + \delta^2 + n p\delta + \delta^2 - \delta x c\delta + \delta^2 - \mapsto$$

$$\overline{S} n c\delta + \delta^2 - p p\delta + \delta^2 + n p\delta + \delta^2 - \delta x c\delta + \delta^2 - \mapsto$$

$$\overline{S\,T\delta S} n c\delta + \delta^2 - p p\delta + \delta^2 + n p\delta + \delta^2 - \delta x c\delta + \delta^2 - \mapsto$$

$$\overline{SS\,T\delta^2 S} n c\delta + \delta^2 - p p\delta + \delta^2 + n p\delta + \delta^2 - \delta x c\delta + \delta^2 - \mapsto$$

$$\overline{SS\,T\delta^2} + n c\delta + \delta^2 - p p\delta + \delta^2 + n p\delta + \delta^2 - \delta x c\delta + \delta^2 - \mapsto$$

$$\overline{SS\delta^2} + n c\delta + \delta^2 - p p\delta + \delta^2 + n p\delta + \delta^2 - \delta x c\delta + \delta^2 - \mapsto$$

$$\overline{SS\,T\delta S\delta^2} + n c\delta + \delta^2 - p p\delta + \delta^2 + n p\delta + \delta^2 - \delta x c\delta + \delta^2 - \mapsto$$

$$\overline{SS\,T\delta} + \delta^2 + n c\delta + \delta^2 - p p\delta +$$

$$\delta^2 + n p\delta + \delta^2 - \delta x c\delta + \delta^2 - \mapsto$$

$$\overline{SS\delta} + \delta^2 + n c\delta + \delta^2 - p p\delta + \delta^2 + n p\delta + \delta^2 - \delta x c\delta + \delta^2 - \mapsto$$

$$\overline{S} p c\delta + \delta^2 + n c\delta + \delta^2 - p p\delta + \delta^2 + n p\delta + \delta^2 - \delta x c\delta + \delta^2 - \mapsto$$

$$\overline{S\,T\delta S} p c\delta + \delta^2 + n c\delta + \delta^2 - p p\delta + \delta^2 + n p\delta + \delta^2 -$$

$$\delta x c\delta + \delta^2 - \mapsto \overline{SS\,T\delta^2 S} p c\delta + \delta^2 + n c\delta + \delta^2 - p p\delta +$$

-continued
$$\delta^2 + np\delta + \delta^2 - \delta xc\delta + \delta^2 - \mapsto \overline{SS}\,\overline{T}\delta^2 - pc\delta + \delta^2 +$$
$$nc\delta + \delta^2 - pp\delta + \delta^2 + np\delta + \delta^2 - \delta xc\delta + \delta^2 - \mapsto$$
$$\overline{SS}\delta^2 - pc\delta + \delta^2 + nc\delta + \delta^2 - pp\delta + \delta^2 + np\delta + \delta^2 -$$
$$\delta xc\delta + \delta^2 - \mapsto \overline{SS}\,\overline{T}\delta\overline{S}\delta^2 - pc\delta + \delta^2 + nc\delta + \delta^2 - pp\delta +$$
$$\delta^2 + np\delta + \delta^2 - \delta xc\delta + \delta^2 - \mapsto \overline{SS}\,\overline{T}\delta + \delta^2 - pc\delta +$$
$$\delta^2 + nc\delta + \delta^2 - pp\delta + \delta^2 + np\delta + \delta^2 - \delta xc\delta + \delta^2 - \mapsto$$
$$\overline{SS}\delta + \delta^2 - pc\delta + \delta^2 + nc\delta + \delta^2 - pp\delta + \delta^2 + np\delta +$$
$$\delta^2 - \delta xc\delta + \delta^2 - \mapsto \overline{S}ns\delta + \delta^2 - pc\delta + \delta^2 +$$
$$nc\delta + \delta^2 - pp\delta + \delta^2 + np\delta + \delta^2 - \delta xc\delta + \delta^2 - \mapsto$$
$$\overline{S}\,\overline{T}\delta\overline{S}ns\delta + \delta^2 - pc\delta + \delta^2 + nc\delta + \delta^2 - pp\delta + \delta^2 +$$
$$np\delta + \delta^2 - \delta xc\delta + \delta^2 - \mapsto \overline{SS}\,\overline{T}\delta^2\overline{S}ns\delta + \delta^2 - pc\delta +$$
$$\delta^2 + nc\delta + \delta^2 - pp\delta + \delta^2 + np\delta + \delta^2 - \delta xc\delta + \delta^2 - \mapsto$$
$$\overline{SS}\,\overline{T}\delta^2 + ns\delta + \delta^2 - pc\delta + \delta^2 + nc\delta + \delta^2 - pp\delta + \delta^2 +$$
$$np\delta + \delta^2 - \delta xc\delta + \delta^2 - \mapsto \overline{SS}\delta^2 + ns\delta + \delta^2 - pc\delta +$$
$$\delta^2 + nc\delta + \delta^2 - pp\delta + \delta^2 + np\delta + \delta^2 - \delta xc\delta + \delta^2 - \mapsto$$
$$\overline{SS}\,\overline{T}\delta\overline{S}\delta^2 + ns\delta + \delta^2 - pc\delta + \delta^2 + nc\delta + \delta^2 - pp\delta + \delta^2 +$$
$$np\delta + \delta^2 - \delta xc\delta + \delta^2 - \mapsto \overline{SS}\,\overline{T}\delta + \delta^2 + ns\delta + \delta^2 - pc\delta +$$
$$\delta^2 + nc\delta + \delta^2 - pp\delta + \delta^2 + np\delta + \delta^2 - \delta xc\delta + \delta^2 - \mapsto$$
$$\overline{SS}\delta + \delta^2 + ns\delta + \delta^2 - pc\delta + \delta^2 + nc\delta + \delta^2 - pp\delta + \delta^2 +$$
$$np\delta + \delta^2 - \delta xc\delta + \delta^2 - \mapsto \overline{S}ps\delta + \delta^2 + ns\delta + \delta^2 - pc\delta +$$
$$\delta^2 + nc\delta + \delta^2 - pp\delta + \delta^2 + np\delta + \delta^2 - \delta xc\delta + \delta^2 - \mapsto$$
$$\overline{S}\,\overline{T}\delta\overline{S}ps\delta + \delta^2 + ns\delta + \delta^2 - pc\delta + \delta^2 + nc\delta +$$
$$\delta^2 - pp\delta + \delta^2 + np\delta + \delta^2 - \delta xc\delta + \delta^2 - \mapsto$$
$$\overline{S}\,\overline{T}\delta + ps\delta + \delta^2 + ns\delta + \delta^2 - pc\delta + \delta^2 + nc\delta +$$
$$\delta^2 - pp\delta + \delta^2 + np\delta + \delta^2 - \delta xc\delta + \delta^2 - \mapsto$$
$$\overline{S}\delta + ps\delta + \delta^2 + ns\delta + \delta^2 - pc\delta + \delta^2 + nc\delta + \delta^2 - pp\delta + \delta^2 +$$
$$np\delta + \delta^2 - \delta xc\delta + \delta^2 - \mapsto stk\delta + ps\delta + \delta^2 + ns\delta + \delta^2 -$$
$$pc\delta + \delta^2 + nc\delta + \delta^2 - pp\delta + \delta^2 + np\delta + \delta^2 - \delta xc\delta + \delta^2 -$$

The invention claimed is:

1. A computer implemented method for designing a part, wherein the part is modeled by using:
   a seed structure of a context-free grammar,
   a set of rules of the grammar,
   at least two design features, each design feature being defined by at least one rule of the set,
   a priority order between the design features determined by the seed structure and the set of rules,
   the method comprising the steps of:
   displaying a representation of the part in a graphical user interface according to the priority order,
   modifying the priority order between said two design features by modifying the set of rules, and
   displaying a representation of the part according to the modified priority order.

2. The method of claim 1, wherein at the step of modifying the priority order, a swap rule is added to the set of rules.

3. The method of claim 1, wherein
   the set of rules comprises a swap rule, and
   at the step of modifying the priority order, the swap rule is removed from the set of rules.

4. The method of claim 1, wherein
   the set of rules comprises a swap rule, and
   at the step of modifying the priority order, an un-swap rule is added to the set of rules.

5. The method of claim 1, wherein at the step of modifying the priority order, a bring-to-front rule or a send-to-back rule is added to the set of rules, upon which the priority order is modified.

6. The method of claim 1, wherein the method further comprises a step of applying the rules to the seed structure before each step of displaying.

7. The method of claim 6, wherein applying each rule modifies the seed structure according to at least one non-terminal symbol of the rule.

8. The method of claim 7, wherein each rule replaces a non-terminal symbol of the seed structure corresponding to the non-terminal symbol of the rule.

9. The method of claim 1, wherein each design feature has a type which is one of:
   a stock feature type,
   a push feature type,
   a contact feature type,
   a stiffener feature type,
   a cut feature type, and
   a surface extraction feature type.

10. The method of claim 9, wherein at the step of modifying the priority order, a swap rule dependent on the type of the two design features is added to the set of rules.

11. The method of claim 1, wherein the seed structure and the set of rules define a default priority order between the features according to a respective type of the features.

12. The method of claim 10, wherein
    the seed structure and the set of rules define a default priority order between the features according to their respective type, and
    a stiffener feature has a lower default priority than a contact feature, which itself has a lower default priority than a push feature, which itself has a lower default priority than a cut feature.

13. A computer-aided design system, wherein the system comprises:
    a) a processor;
    b) a database coupled to the processor and storing a part modeled by:
       a seed structure of a context-free grammar,
       a set of rules of the grammar,
       at least two design features, each design feature being defined by at least one rule of the set,
       a priority order between the design features determined by the seed structure and the set of rules,
    and
    c) a graphical user interface coupled to the processor and suitable for enabling a user to design the part, said enabling being by:
       displaying a representation of the part in the graphical user interface according to the priority order,
       modifying the priority order between said two design features by modifying the set of rules, and
       displaying a representation of the part according to the modified priority order.

14. A non-transitory computer readable storage medium having recorded thereon a computer program comprising instructions for execution by a computer, wherein the instructions comprise means for causing the computer to enable a user to design a part through a graphical user interface of a computer-aided design system, wherein the part is modeled by using:
    a seed structure of a context-free grammar,
    a set of rules of the grammar, at least two design features, each design feature being defined by at least one rule of the set,
a priority order between the design features determined by the seed structure and the set of rules;
wherein the instructions cause the computer to:
display a representation of the part in the graphical user interface according to the priority order,
modify the priority order between said two design features by modifying the set of rules, and
display a representation of the part according to the modified priority order.

* * * * *